(12) United States Patent
Voss et al.

(10) Patent No.: US 11,154,815 B2
(45) Date of Patent: Oct. 26, 2021

(54) EXHAUST GAS TREATMENT SYSTEM

(71) Applicant: BASF Corporation, Florham Park, NJ (US)

(72) Inventors: Kenneth E. Voss, Somerville, NJ (US);
Jaya L. Mohanan, Edison, NJ (US);
Kevin A. Hallstrom, Clinton, NJ (US);
Sandip D. Shah, Yardley, PA (US);
John K. Hochmuth, Raritan, NJ (US)

(73) Assignee: BASF Corporation, Florham Park, NJ (US)

( * ) Notice: Subject to any disclaimer, the term of this patent is extended or adjusted under 35 U.S.C. 154(b) by 173 days.

(21) Appl. No.: 15/552,183

(22) PCT Filed: Feb. 26, 2016

(86) PCT No.: PCT/US2016/019842
§ 371 (c)(1),
(2) Date: Aug. 18, 2017

(87) PCT Pub. No.: WO2016/138418
PCT Pub. Date: Sep. 1, 2016

(65) Prior Publication Data
US 2018/0043305 A1   Feb. 15, 2018

Related U.S. Application Data

(60) Provisional application No. 62/121,541, filed on Feb. 27, 2015.

(51) Int. Cl.
*B01D 53/94*   (2006.01)

(52) U.S. Cl.
CPC ..... *B01D 53/9418* (2013.01); *B01D 53/9477* (2013.01); *B01D 53/944* (2013.01);
(Continued)

(58) Field of Classification Search
CPC ...... B01D 2251/2067; B01D 2255/102; B01D 2255/20738; B01D 2255/20761;
(Continued)

(56) References Cited

U.S. PATENT DOCUMENTS

| 4,961,917 A | 10/1990 | Byrne |
| 7,097,817 B2 | 8/2006 | Brisley |

(Continued)

FOREIGN PATENT DOCUMENTS

| DE | 10 2012 005508 A1 | 9/2013 |
| EA | 008806 | 8/2006 |

(Continued)

OTHER PUBLICATIONS

Extended European Search Report for European Application 16756473.1; dated Oct. 11, 2018.
(Continued)

*Primary Examiner* — Anthony Ayala Delgado
(74) *Attorney, Agent, or Firm* — Finnegan, Henderson, Farabow, Garrett & Dunner LLP

(57) ABSTRACT

Described are exhaust gas treatment systems for treatment of an engine exhaust gas stream containing NOx. The exhaust gas treatment system comprises an engine, a catalyst system including a selective catalytic reduction article comprising two zones, an upstream zone comprising iron-promoted first molecular sieves and a downstream zone comprising copper-promoted second molecular sieves. The catalyst system is effective to reduce high NOx levels in the exhaust gas stream. Also described are methods for treatment of engine exhaust gas streams, comprising treating engine exhaust gas streams containing high NOx levels with catalyst systems including selective catalytic reduction articles having two zones.

29 Claims, 26 Drawing Sheets

(52) U.S. Cl.
CPC .. *B01D 53/9436* (2013.01); *B01D 2251/2067* (2013.01); *B01D 2255/102* (2013.01); *B01D 2255/20738* (2013.01); *B01D 2255/20761* (2013.01); *B01D 2255/50* (2013.01); *B01D 2255/9032* (2013.01); *B01D 2258/012* (2013.01); *Y02T 10/12* (2013.01)

(58) Field of Classification Search
CPC ........ B01D 2255/50; B01D 2255/9032; B01D 2258/012; B01D 53/9418; B01D 53/9436; B01D 53/944; B01D 53/9477; Y02T 10/24
See application file for complete search history.

(56) References Cited

U.S. PATENT DOCUMENTS

| | | | |
|---|---|---|---|
| 8,506,893 | B2 | 8/2013 | Gandhi et al. |
| 2011/0056187 | A1* | 3/2011 | Seyler ................ B01D 53/9418 60/274 |
| 2012/0222401 | A1* | 9/2012 | Scherer ................ F01N 3/0842 60/274 |
| 2012/0275977 | A1 | 11/2012 | Chandler |
| 2013/0052125 | A1* | 2/2013 | Moini .................... C01B 39/48 423/700 |
| 2013/0136677 | A1 | 5/2013 | Chandler et al. |
| 2014/0020364 | A1* | 1/2014 | Wittrock ................ F01N 3/10 60/274 |
| 2014/0241950 | A1 | 8/2014 | Chandler et al. |
| 2014/0271422 | A1 | 9/2014 | Tang |
| 2014/0271426 | A1* | 9/2014 | Casci ................ B01D 53/9418 423/213.2 |
| 2014/0301923 | A1 | 10/2014 | Tang et al. |
| 2015/0118121 | A1 | 4/2015 | Chen et al. |
| 2015/0246346 | A1* | 9/2015 | Chandler ................ C01B 39/02 502/74 |
| 2016/0038878 | A1* | 2/2016 | Sonntag ............... B01J 35/0006 423/213.5 |
| 2016/0101413 | A1* | 4/2016 | Fedeyko ............ B01D 53/9436 422/171 |

FOREIGN PATENT DOCUMENTS

| | | |
|---|---|---|
| EP | 0393905 A2 | 10/1990 |
| RU | 2108140 | 4/1998 |
| WO | WO 2013/014467 | 1/2013 |
| WO | WO2014/062944 | 4/2014 |
| WO | WO 2016-020806 A1 | 2/2016 |

OTHER PUBLICATIONS

"Final Report of a CRADA Between Pacific Northwest National Laboratory and Cummins, Incorporated (CRADA No. PNNL/283): Enhanced High and Low Temperature Performance of NOx Reduction Catalyst Materials", F. Gao et al., http://www.ntis.gov/ordering.htm; Sep. 2016.

Chinese Office Action dated May 6, 2021. 10 pages.

* cited by examiner

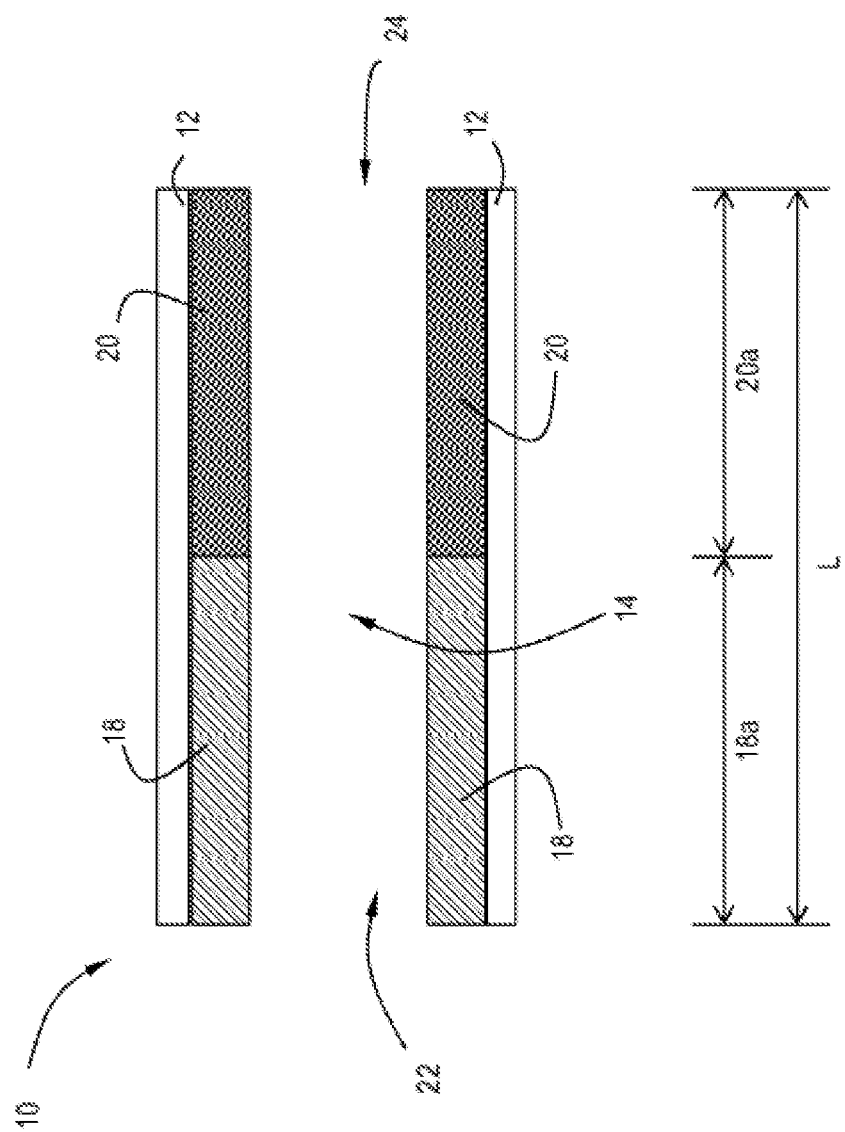

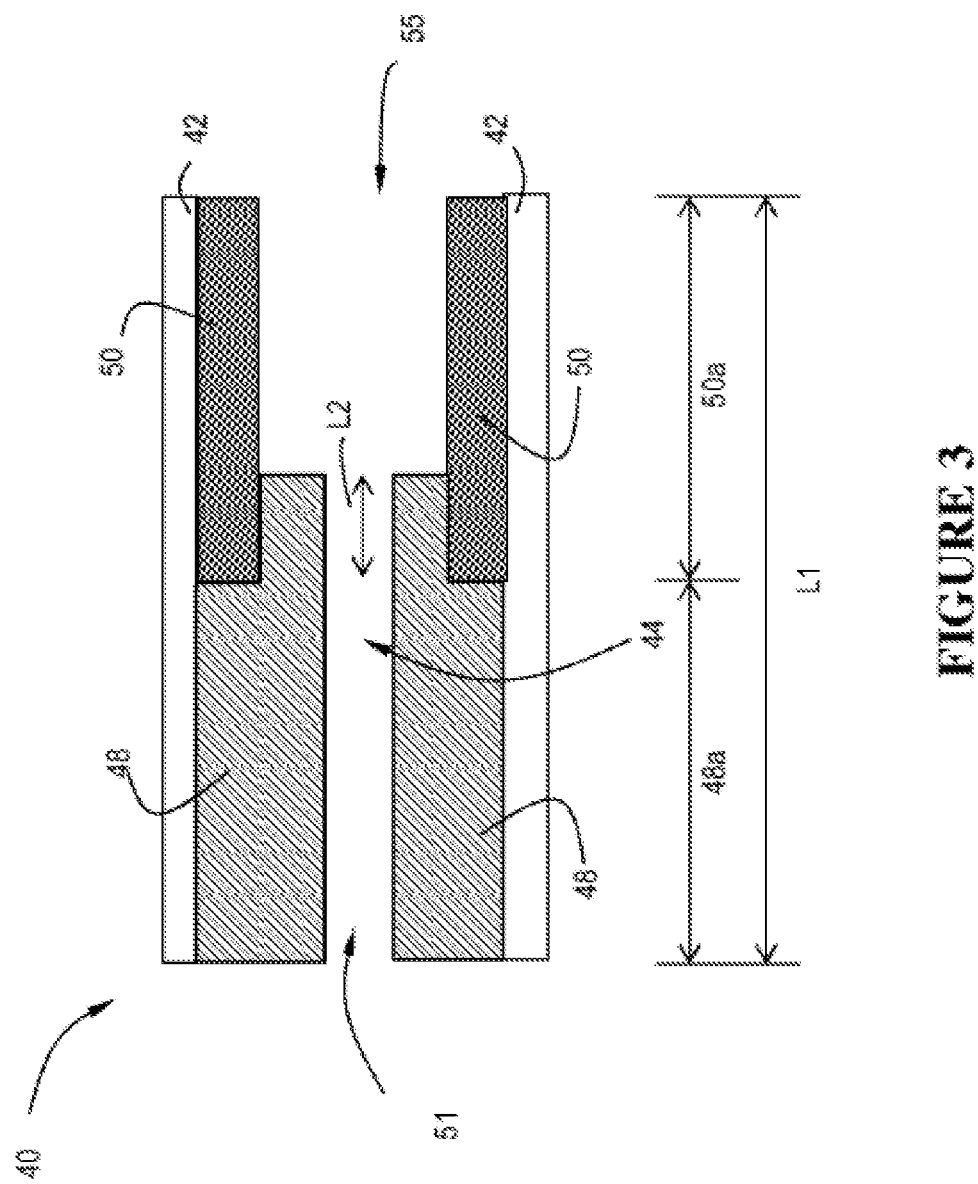

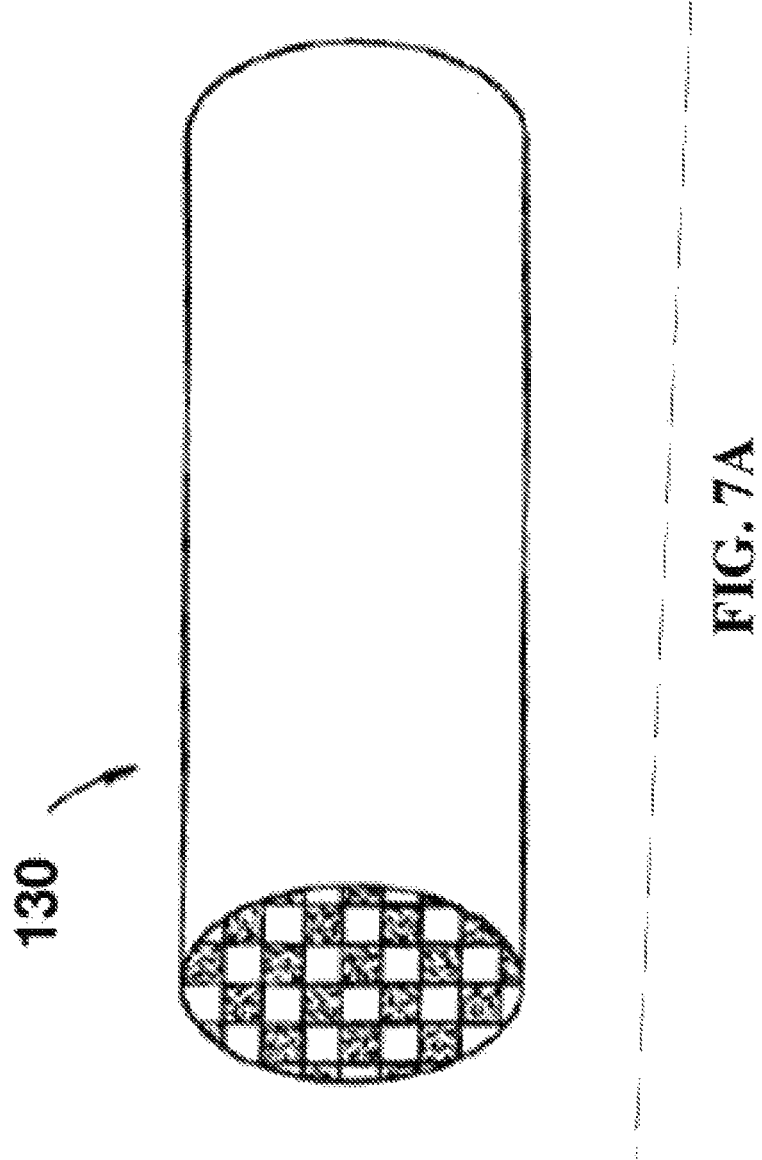

EXHAUST GAS TREATMENT SYSTEM

CROSS-REFERENCE TO RELATED APPLICATIONS

The present application is a U.S. National Stage of International Patent Application PCT/US2016/019842, filed Feb. 26, 2016, and claims priority to U.S. Provisional Patent Application No. 62/121,541, filed Feb. 27, 2015. The disclosures of each of the applications noted above are incorporated herein by reference in their entirety.

TECHNICAL FIELD OF THE INVENTION

The present invention relates generally to the field of selective catalytic reduction and to methods of selectively reducing nitrogen oxides. More particularly, embodiments of the invention relate to an exhaust gas system for treatment of an engine exhaust gas stream containing $NO_x$.

BACKGROUND OF THE INVENTION

Over time, the harmful components of nitrogen oxides ($NO_x$) have led to atmospheric pollution. $NO_x$ is contained in exhaust gases such as from internal combustion engines (e.g., automobiles and trucks), from combustion installations (e.g., power stations heated by natural gas, oil, or coal), and from nitric acid production plants.

Various methods have been used in the treatment of $NO_x$-containing gas mixtures. One type of treatment involves catalytic reduction of nitrogen oxides. There are two processes: (1) a nonselective reduction process wherein carbon monoxide, hydrogen, or a lower hydrocarbon is used as a reducing agent, and (2) a selective reduction process wherein ammonia or ammonia precursor is used as a reducing agent. In the selective reduction process, a high degree of removal with nitrogen oxide can be obtained with a small amount of reducing agent.

The selective reduction process is referred to as a SCR process (Selective Catalytic Reduction). The SCR process uses catalytic reduction of nitrogen oxides with ammonia in the presence of atmospheric oxygen with the formation predominantly of nitrogen and steam:

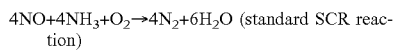
4NO+4NH$_3$+O$_2$→4N$_2$+6H$_2$O (standard SCR reaction)

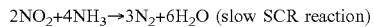
2NO$_2$+4NH$_3$→3N$_2$+6H$_2$O (slow SCR reaction)

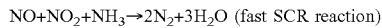
NO+NO$_2$+NH$_3$→2N$_2$+3H$_2$O (fast SCR reaction)

Catalysts employed in the SCR process ideally should be able to retain good catalytic activity over the wide range of temperature conditions of use, for example, 200° C. to 600° C. or higher, under hydrothermal conditions. Hydrothermal conditions are often encountered in practice, such as during the regeneration of a soot filter, a component of the exhaust gas treatment system used for the removal of particles.

Current heavy duty diesel (HDD) engines have their main exhaust emissions reduction requirements in nitrogen oxides ($NO_x$) and particulate matter (PM). Particulates can be controlled using diesel particulate filters (DPF), both without and with catalysts (CSF). The main means of reducing $NO_x$ in HDD applications is selective catalytic reduction (SCR) through the use of vanadium based catalysts or zeolite based catalysts.

Newer governmental regulations demand higher performance from the SCR catalysts. The current 2013 U.S. on-road regulatory $NO_x$ emissions standard is 0.2 g/brake horsepower house (bhph) over the heavy duty transient cycle (HDDT or HD FTP). European and Worldwide off-road $NO_x$ standards and test cycles (e.g. WHTC & NRTC) are distinct from those in the U.S. Typical engine-out NQ emissions levels for HDD on-road applications are in the 2-3 g/bhph range. To just meet the $NO_x$ emissions standard requires 90-93% $NO_x$ reduction. However, there is also a desire to reduce/eliminate the use of exhaust gas recirculation (EGR) on HDD engines, which would result in a reduction in greenhouse gas emissions (e.g. $CO_2$), and an increase in fuel economy. Reducing EGR, however, will lead to increases in engine-out $NO_x$ emissions from current levels of 2-3 g/bhph to, for example, 4-7 g/bhph. These higher engine-out $NO_x$ emissions levels would require even higher $NO_x$ conversion (95-98%) just to meet the current $NO_x$ standard. Thus, there is a need for an SCR catalyst that is capable of meeting the conflicting goals of low-temperature (e.g., 200° C.-300° C.) $NO_x$ conversion and a reduction in EGR, which places extreme demands on the ability of the SCR catalyst to reduce $NO_x$ and meet governmental regulatory limits.

SUMMARY OF THE INVENTION

A first aspect of the invention is directed to an exhaust gas treatment system, which comprises an engine producing an exhaust gas stream and a catalyst system including a selective catalytic reduction article. This selective catalytic reduction article has two zones, an upstream zone comprising an iron-promoted first molecular sieve material, and a downstream zone comprising a copper-promoted second molecular sieve material. In some embodiments, the first and second molecular sieve material has a double six ring unit. In some embodiments, the iron-promoted molecular sieve material and the copper-promoted molecular sieve material are coated onto a substrate having an axial length and an upstream end and a downstream end, wherein the upstream zone comprising an iron-promoted first molecular sieve material is coated onto the upstream end of the single substrate and the downstream zone comprising a copper-promoted second molecular sieve material is coated onto the downstream end of the single substrate.

In another embodiment, the substrate comprises a flow through monolith. In another embodiment, the substrate is a wall flow filter.

In another embodiment, the upstream zone and the downstream zone at least partially overlap. In another embodiment, the upstream zone is coated such that the upstream zone at least partially overlaps with the downstream zone. In another embodiment, the downstream zone is coated such that the downstream zone at least partially overlaps with the upstream zone. In another embodiment, the upstream zone abuts the downstream zone. In another embodiment, there is a gap between the upstream zone and downstream zone.

In another embodiment, the iron-promoted first molecular sieve material is present in an amount of from about 0.01% to about 10.0% by weight iron, calculated as iron oxide. In another embodiment, the copper-promoted second molecular sieve material is present in an amount of from about 2% to about 5% by weight copper, calculated as copper oxide.

In another embodiment, the exhaust gas treatment system has the upstream zone on a first substrate, wherein the first substrate comprises a first and second zone, wherein the first zone comprises the iron-promoted first molecular sieve material and the second zone comprises a copper-promoted third molecular sieve material, wherein the first zone is exposed to the exhaust gas stream prior to the second zone; and wherein the downstream zone is on a second substrate.

In some embodiments, the exhaust gas treatment system has the upstream zone on a second substrate and the downstream zone is on a first substrate, wherein the first substrate comprises a first and second zone, wherein the first zone comprises an iron-promoted fourth molecular sieve material and the second zone comprises the copper-promoted second molecular sieve material, wherein the first zone is exposed to the exhaust gas stream prior to the second zone. In another embodiment, the first zone abuts the second zone on the first substrate. In another embodiment, the first zone extends at least 50% of the total axial length of the first substrate. In another embodiment, the first zone extends less than 50% of the total axial length of the first substrate. In another embodiment, the first zone extends less than 35% of the total axial length of the first substrate. In another embodiment, the upstream zone and the downstream zone are coated onto the same substrate. In some embodiments, the upstream zone is coated onto a first substrate and the downstream zone is coated onto a second substrate. In another embodiment, the first substrate comprises a wall flow filter and the second substrate comprises a flow through monolith.

In another embodiment, the selective catalytic reduction article in the catalyst system further comprises a top washcoat layer and a bottom washcoat layer, wherein the bottom washcoat layer comprises a copper-promoted fifth molecular sieve material coated directly onto the substrate, and the top washcoat layer comprises the upstream zone and the downstream zone coated directly onto the top of the bottom washcoat layer. In another embodiment, the exhaust gas treatment system further comprises an ammonia oxidation catalyst located downstream of the selective catalytic reduction article. In another embodiment, the ammonia oxidation catalyst comprises a platinum group metal and a molecular sieve promoted with copper, iron, or combinations thereof.

In another embodiment, the first and second molecular sieve materials have a framework type selected from AEI, CHA, and AFX. In another embodiment, the first and second molecular sieve materials contain a CHA framework type.

In another embodiment, the exhaust gas treatment system further comprises a catalyzed soot filter (CSF) located upstream of the selective catalytic reduction article.

Another aspect of the invention describes a method for treatment of an engine exhaust gas stream, the method comprising treating an engine exhaust gas stream containing $NO_x$ with a catalyst system including a selective catalytic reduction article comprising two zones including (1) an upstream SCR zone that does not contain a copper-promoted zeolite, the upstream zone operative to minimize formation of $N_2O$; and (2) a downstream active SCR zone comprising a copper-promoted molecular sieve having a double six ring unit. In some embodiments, the exhaust gas treatment system is effective to reduce $NO_x$ levels. In some embodiments, the exhaust gas treatment system is effective to reduce $NO_x$ levels exceeding 4 g/bhph in the exhaust gas stream.

In some embodiments, the exhaust gas stream flows through an upstream catalyzed soot filter to produce an outflow $NO_2/NO_x$ ratio of about 0.1 to about 0.85 prior to reaching the upstream SCR zone. In another embodiment, the upstream SCR zone comprises an iron-promoted molecular sieve material having a double six ring unit. In another embodiment, the upstream SCR zone and the downstream active SCR zone contain a CHA framework type.

In another embodiment, the method further comprises the addition of a reductant to the exhaust gas stream prior to such exhaust gas stream contacting the SCR zone(s), wherein the amount of reductant added is in excess. In some embodiments, the amount of reductant added is in a molar ratio of reductant to $NO_x$ of at least about 1.05. In another embodiment, the gaseous reductant is urea. In another embodiment, the formation of $N_2O$ is at least about 65% lower compared to a catalyst system, wherein the upstream SCR zone does not comprise an iron-promoted molecular sieve. In another embodiment, the exhaust gas stream passes through the catalytic article such that $NO_x$ conversion is at least about 75%.

BRIEF DESCRIPTION OF DRAWINGS

FIG. 2A shows a partial cross-sectional view of catalytic article according to one or more embodiments;

FIG. 3 shows a partial cross-sectional view of catalytic article according to one or more embodiments;

FIG. 7A shows a perspective view of a wall flow filter substrate;

DETAILED DESCRIPTION OF THE INVENTION

Figure 1:
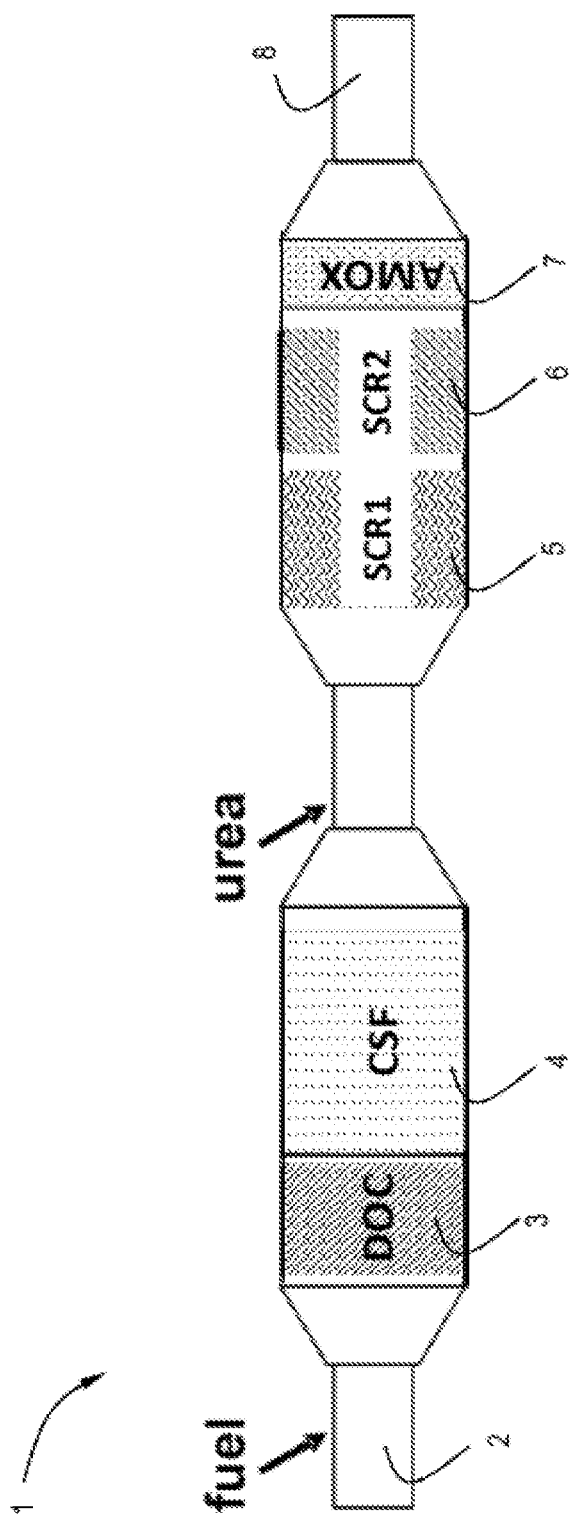
FIG. 1 is a diagram of a catalyst system configuration used in heavy duty transient cycle engines.

Before describing several exemplary embodiments of the invention, it is to be understood that the invention is not limited to the details of construction or process steps set forth in the following description. The invention is capable of other embodiments and of being practiced or being carried out in various ways.

The present invention provides an exhaust gas treatment system, which includes a selective catalytic reduction (SCR) article suitable for at least partial conversion of gaseous NO$_x$ emissions and a reduction in N$_2$O make. The SCR article includes two zones: an upstream zone and a downstream zone. The upstream zone includes an iron-promoted first molecular sieve material and the downstream zone comprises a copper-promoted second molecular sieve material. Both molecular sieve materials have a double six ring unit. For example, copper-promoted molecular sieve material such as chabazite (CHA) is very active in the conversion of NO$_x$ in the presence of a gaseous reducing agent such as ammonia, thereby significantly reducing NO$_x$ emission levels in the exhaust gas stream. However, NO$_2$ is produced as an unwanted side product. On the other hand iron-promoted molecular sieve material such as chabazite exhibits less activity towards the conversion of NO$_x$ produces NH$_3$ as a side product, which can further be used in the reduction of NO$_x$ and produces significantly lower levels of N$_2$O. Therefore, a selective catalytic reduction (SCR) article, which comprises an upstream zone of iron-promoted chabazite can convert NO$_x$ at a slower rate producing little N$_2$O and generate NH$_3$, which is subsequently used as a reducing agent in conjunction with copper-promoted chabazite in the downstream zone of the catalytic article, where the remaining amount of NO$_x$ in the already treated exhaust gas stream is converted by the more active catalyst composition (i.e., copper-promoted chabazite).

Governmental regulations mandate the use of NO$_x$ reduction technologies for light and heavy-duty vehicles. Selective catalytic reduction (SCR) of NO$_x$ using urea is an effective and dominant emission control technology for NO$_x$ control. The current NO$_x$ emissions standard, e.g. for the United States, on-road is about 0.2 g/bhph (or about 0.27 g/KWh) over the heavy duty transient cycle. Meeting this standard is required for the entire life cycle of the engine, which is, from when the catalyst is brand new, or in the "fresh" condition, to the end of the regulatory "full useful life" (435,000 miles on the engine). Moreover, original equipment manufacturer (OEM) customers often desire that this standard to be achieved for the engine to run for 1 million miles. Typical engine-out NQ emissions have been in the range of 1.7-2.5 g/bhph, thus requiring 90-93% NO$_x$ reduction by current SCR catalysts in order to meet the current regulatory standards. OEMs, however, are increasing the engine-out NO$_x$ emissions levels to as much as 4-7 g/bhph by reducing/eliminating the use of exhaust gas recirculation (EGR). This places a larger burden on the SCR catalyst, with needs for higher NO$_x$ reduction (95-98%).

Reducing EGR reduces the OEM's engine-out CO$_2$ (greenhouse gas) emissions, which have emerged as a new set of emissions requirements and reducing EGR also results in better fuel economy for the engine, which is desirable for customers with the ever increasing costs associated with fuel. Another emerging trend for the heavy duty diesel OEMs is to reduce the size of the exhaust aftertreatment system, which means that there will be less volume of SCR catalyst available. This is a further challenge, in that the SCR catalyst must achieve higher NO$_x$ conversion but with less catalyst volume. Yet another trend resulting from less EGR and other engine changes the OEMs are making, include lower operation exhaust temperatures. The lower operation exhaust temperatures require the SCR catalyst to have improved performance at lower temperatures. Zeolite copper chabazite (Cu-CHA) based SCR catalyst exhibit the best low temperature performance, but the lower engine-out temperatures are likely to require even better low temperature activity.

As mentioned previously, a by-product of the SCR reaction, especially for high performance Cu-CHA SCR catalysts, is N$_2$O. Although N$_2$O is not toxic, it is a powerful greenhouse gas (~300×CO$_2$) and, thus, regulatory agencies have capped N$_2$O emissions at 0.1 g/bhph. Above that level, OEMs must pay a fine and/or add to their actual engine-out CO$_2$ emissions levels. Adequate control of tailpipe (SCR-out) N$_2$O is, therefore, a major concern. The overall challenges are achieving very high End-of-Life NO$_x$ conversion (about 97-98%) for higher engine-out NO$_x$ levels, with less catalyst volume and with lower exhaust temperatures, while limiting tailpipe N$_2$O emissions.

Surprisingly, it has been found that use of unique and selected configurations of SCR catalyst systems including both an iron-promoted molecular sieve material and a copper-promoted molecular sieve material can provide good NO$_x$ conversion with much lower N$_2$O produced as a by-product of the SCR reaction. In one or more embodiments, the disclosure provides a catalyst system comprising two SCR zones. As mentioned previously, the first of the two zones, without intending to be bound by theory, is thought to be the "N$_2$O-optimized" zone and comprises an iron-promoted first molecular sieve material. The second zone is thought to be the catalytically "active" zone and comprises a copper-promoted second molecular sieve material. In some embodiments, the "N$_2$O-optimized" zone may itself be zoned to comprise an iron-promoted molecular sieve material and a copper-promoted molecular sieve material. In some embodiments, the catalytically "active" zone may be zoned to contain an iron-promoted molecular sieve material and a copper-promoted molecular sieve. The catalyst system of one or more embodiments offers the dual benefits of limited N$_2$O-make and excellent NO$_x$ conversion at low temperatures (about 200° C. to about 300° C.).

Embodiments of the invention are directed to an exhaust gas system for treatment of an engine exhaust gas stream, e.g., including, but not limited to, an exhaust gas system for treatment of an exhaust gas stream containing high NO$_x$, such as $NO_x$ levels exceeding 2 g/bhph. In one or more embodiments, the exhaust gas treatment system comprises an engine producing an exhaust gas stream (which may be an engine producing an exhaust gas stream containing, e.g., $NO_x$ levels exceeding 2 g/bhph) over a heavy duty transient cycle; a catalyst system including a selective catalytic reduction article including two zones, (1) an upstream zone comprising an iron-promoted first molecular sieve material coated onto a first substrate, and (2) a downstream zone comprising a copper-promoted second molecular sieve material coated onto a second substrate, wherein the first and second molecular sieves have a double six ring unit. In one or more embodiments, the catalyst system is effective to reduce $NO_x$ levels exceeding 2 g/bhph in the exhaust gas stream to below 0.2 g/bhph.

The metal-promoted molecular sieves catalyst compositions in the upstream and downstream zones can be prepared using metal ion-exchange processes rather than incipient wetness impregnation techniques to generate the individual catalyst composition, which can then be coated onto a substrate using a washcoat technique as set forth more fully below.

Ion-exchange is a process commonly used for exchanging ions residing in a porous support with an outside metal ion of interest. For example, a zeolite prepared with sodium ions residing in the pores can be exchanged with a different metal ion to form an ion-exchanged porous support. This is accomplished by preparing a slurry of the porous support, i.e., zeolite, in a solution containing the outside metal ion of interest to be exchanged. Heat may be optionally applied during this process. The outside metal ion can diffuse into the pores of the support and exchange with the residing ion, i.e., sodium, to form the ion exchanged porous support.

For example, a Na form of chabazite zeolite can be contacted with precursor metals, which contain the promoter metal, i.e., metal ion used in the ion-exchange process. Aqueous solutions of water soluble compounds or complexes of the metal precursors are typically utilized, such as nitrate or acetate salts of the metal precursors with specific examples including copper (II) nitrate, copper (II) acetate, iron (II) acetate, iron (III) nitrate, and iron (III) acetate. Following treatment of the support particles such as molecular sieves with the solution of the metal precursors, the particles are dried, such as by heat treating the particles at elevated temperature (e.g., about 100-150° C.) for a period of time (e.g., about 1-3 hours), and then calcining to convert the metal components to a more catalytically active oxide form. An exemplary calcination process involves heat treatment in air at a temperature of about 500-800° C. for about 1-3 hours. The above process can be repeated as needed to reach the desired level of metal precursor impregnation. The resulting material can be stored as a dry powder or in slurry form. With respect to the terms used in this disclosure, the following definitions are provided.

As used herein, the term "catalyst" or "catalyst composition" or "catalyst material" refers to a material that promotes a reaction.

As used herein, the term "catalytic article" refers to an element that is used to promote a desired reaction. For example, a catalytic article may comprise a washcoat containing a catalytic species, e.g. a catalyst composition, on a substrate, for example, a honeycomb substrate.

As used herein, the term "heavy duty transient cycle" refers to emissions testing cycles used for testing heavy duty on-road engines. Heavy duty transient cycle includes the Federal Test Procedure Heavy Duty (FTP HD) transient cycle, the U.S. heavy duty diesel transient cycle (HDDT), the World Harmonized transient cycle (WHTC), the European Transient Cycle (ETC), the non-road transient cycle (NRTC), and the Japanese JE05 transient cycle. FIG. 1 shows a catalyst system configuration often used in heavy duty transient cycle engine tests. Specifically, FIG. 1 shows a catalyst system configuration 1 comprising a Diesel Oxidation Catalyst (DOC) 3 downstream from an exhaust inlet 2, a Catalytic Soot Filter (CSF) 4, two Selective Catalytic Reduction (SCR) catalysts 5 and 6, and an Ammonia Oxidation (AMOx) catalyst 7 upstream of an exhaust outlet 8. It should be noted that the second SCR 6 and AMOx 7 catalysts can, in some embodiments, be zone-coated onto the same substrate.

As used herein, the terms "brake horsepower hour" and "bhph" refer to the amount of work generated by a motor without taking into consideration any of the various auxiliary components that may slow down the actual speed of the motor. One brake horsepower hour is equivalent to 0.746 kilowatt hours (1 bhph=0.746 KWh). Heavy duty emissions typically are measured in g/bhph (g/KWh).

In one or more embodiments, the exhaust gas treatment system disclosed herein comprises an engine producing an exhaust gas stream containing $NO_x$ levels exceeding about 2 g/bhph (about 2.7 g/KWh) over a heavy duty transient cycle, including exceeding about 2.5 g/bhph (about 3.4 g/KWh), exceeding about 3 g/bhph (about 4.1 g/KWh), exceeding about 3.5 g/bhph (about 4.7 g/KWh), exceeding about 4 g/bhph about (5.4 g/KWh), exceeding about 4.5 g/bhph (about 6.1 g/bhph), exceeding about 5 g/bhph (about 6.7 g/KWh), exceeding about 6 g/bhph (about 8.0 g/KWh), exceeding about 7 g/bhph (about 9.4 g/KWh), exceeding about 8 g/bhph (about 10.7 g/KWh), exceeding about 9 g/bhph (about 12.1 g/KWh), exceeding about 10 g/bhph (about 13.4 g/KWh), exceeding about 11 g/bhph (about 14.8 g/KWh), exceeding about 12 g/bhph (about 16.1 g/KWh), exceeding about 13 g/bhph (about 17.4 g/KWh), exceeding about 14 g/bhph (about 18.8 g/KWh), and exceeding about 15 g/bhph (about 20.1 g/KWh).

In other embodiments, the exhaust gas stream contains $NO_x$ levels in the range of about 2 to about 15 g/bhph (about 2.7 to about 20.1 g/KWh), including in the range of about 3 to about 15 g/bhph (about 4 to about 20.1 g/KWh), including in the range of about 4 to about 15 g/bhph (about 5.4 to about 20.1 g/KWh), about 3 to about 10 g/bhph (about 4 to about 13.4 g/KWh), about 5 to about 15 g/bhph (about 6.7 to about 20.1 g/KWh), about 5 to about 10 g/bhph (about 6.7 to about 13.4 g/KWh), about 6 to about 15 g/bhph (about 8.0 to about 20.1 g/KWh), about 6 to about 10 g/bhph (about 8.0 to about 13.4 g/KWh).

As used herein, the term "normalized stoichiometric ratio" or "NSR" refers to the amount of reducing reagent (e.g., ammonia) needed to achieve the targeted $NO_x$ reduction. In other words, NSR is the mole ratio of, e.g., ammonia to nitrogen oxides $NO_x$ (as $NO_2$) (e.g. $NH_3/NO_2$). NSR values can be in the range of about 0.5 to about 3, preferably about 0.75 to about 2, more preferably about 1.0 to about 1.5 moles of reducing agent, e.g., ammonia per mole of $NO_x$. In one or more embodiments, the engine exhaust gas systems of the invention utilize NSR values of between about 1 and about 1.2, including about 1.0, about 1.05, about 1.1, and about 1.2. A NSR of 1.0 means that the system is operating at stoichiometric levels. A NSR of 1.1 means that there is a 10% overdose of urea injected into the system and a NSR of 1.2 means that there is a 20% overdose of urea injected into the system.

As used herein, the term "selective catalytic reduction" (SCR) refers to the catalytic process of reducing oxides of nitrogen to dinitrogen ($N_2$) using a reductant. As used herein, the terms "nitrogen oxides" or "$NO_x$" designate the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), and nitrogen peroxide ($NO_3$).

In one or more embodiments, the catalyst system comprises a selective catalytic reduction (SCR) article made of two zone, an upstream zone comprising an iron-promoted first molecular sieve material, and a downstream zone comprising a copper-promoted second molecular sieve material, wherein the first and second molecular sieve material have a double six ring unit.

As used herein, the phrase "molecular sieve" refers to framework materials such as zeolites and other framework materials (e.g. isomorphously substituted materials), which may in particulate form in combination with one or more promoter metals be used as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, including silicon and aluminum atoms. According to one or more embodiments, it will be appreciated that by defining the molecular sieves by their framework type, it is intended to include the framework type and any and all isotopic framework materials such as SAPO, ALPO and MeAPO materials having the same framework type as the zeolite materials. In some embodiments, the molecular sieves of the invention (e.g., first, second, third, fourth and fifth molecular sieve) are all the same. In some embodiments, the molecular sieves of the invention (e.g., first, second, third, fourth and fifth molecular sieve) are not all the same. In some embodiments, at least two of the molecular sieves of the invention (e.g., first, second, third, fourth and fifth molecular sieve) are the same.

In more specific embodiments, reference to an aluminosilicate zeolite framework type limits the material to molecular sieves that do not include phosphorus or other metals substituted in the framework. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates. Zeolites are crystalline materials having rather uniform pore sizes which, depending upon the type of zeolite and the type and amount of cations included in the zeolite lattice, range from about 3 to 10 Angstroms in diameter. Zeolites generally comprise silica to alumina (SAR) molar ratios of 2 or greater.

The term "aluminophosphates" refers to another specific example of a molecular sieve, including aluminum and phosphate atoms. Aluminophosphates are crystalline materials having rather uniform pore sizes.

Generally, molecular sieves, e.g. zeolite, are defined as aluminosilicates with open 3-dimensional framework structures composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

In one or more embodiments, the first and second molecular sieve materials, independently, comprise $SiO_4/AlO_4$ tetrahedra and are linked by common oxygen atoms to form a three-dimensional network. In other embodiments, the first and second molecular sieve materials comprise $SiO_4/AlO_4/PO_4$ tetrahedra. The first and second molecular sieve materials of one or more embodiments can be differentiated mainly according to the geometry of the voids which are formed by the rigid network of the ($SiO_4$)/$AlO_4$, or $SiO_4/AlO_4/PO_4$, tetrahedra. The entrances to the voids are formed from 6, 8, 10, or 12 ring atoms with respect to the atoms which form the entrance opening. In one or more embodiments, the first and second molecular sieve materials comprise ring sizes of no larger than 12, including 6, 8, 10, and 12.

According to one or more embodiments, the first and second molecular sieve materials can be based on the framework topology by which the structures are identified. Typically, any framework type of zeolite can be used, such as framework types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

In one or more embodiments, the first and second molecular sieve materials comprise an 8-ring small pore aluminosilicate zeolite. As used herein, the term "small pore" refers to pore openings, which are smaller than about 5 Angstroms, for example on the order of ~3.8 Angstroms. The phrase "8-ring" zeolites refers to zeolites having 8-ring pore openings and double-six ring secondary building units and having a cage like structure resulting from the connection of double six-ring building units by 4 rings. Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic framework types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In one or more embodiments, the first and second molecular sieve materials comprise a d6r unit. Thus, in one or more embodiments, the first and second molecular sieve materials have a framework type selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In other specific embodiments, the first and second molecular sieve materials have a framework type selected from the group consisting of CHA, AEI, AFX, ERI, KFI, LEV, and combinations thereof. In still further specific embodiments, the first and second molecular sieve materials have a framework type selected from CHA, AEI, and AFX. In one or more very specific embodiments, the first and second molecular sieve materials have the CHA framework type.

Zeolitic CHA-framework type molecular sieves includes a naturally occurring tectosilicate mineral of a zeolite group with approximate formula: $(Ca,Na_2,K_2,Mg)Al_2Si_4O_{12} \cdot 6H_2O$ (e.g., hydrated calcium aluminum silicate). Three synthetic forms of zeolitic CHA-framework type molecular sieves are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of another synthetic form of zeolitic CHA framework type, SSZ-13, is described in U.S. Pat. No. 4,544,538, which is hereby incorporated by reference. Synthesis of a synthetic form of a molecular sieve having the CHA framework type, silicoaluminophosphate 34 (SAPO-34), is described in U.S. Pat. Nos. 4,440,871 and 7,264,789, which are hereby incorporated by reference. A method of making yet another synthetic molecular sieve having the CHA framework type, SAPO-44, is described in U.S. Pat. No. 6,162,415, which is hereby incorporated by reference.

The zeolite is typically present in the form of a highly crystalline material, the material being at least about 75% crystalline, at least about 80% crystalline, at least about 85% crystalline, at least about 90% crystalline, at least about 95% crystalline, at least about 98% crystalline, at least about 99% crystalline, or at least about 99.5% crystalline.

Zeolite support material typically exhibits a BET surface area in excess of 60 $m^2/g$, often up to about 200 $m^2/g$ or higher. "BET surface area" has its usual meaning of referring to the Brunauer, Emmett, Teller method for determining surface area by $N_2$ adsorption. In one or more embodiments the BET surface area of zeolite support material employed in the catalysts disclosed herein is at least about 200 $m^2/g$, at least about 400 $m^2/g$, or at least about 600 $m^2/g$.

In one or more embodiments, the first and second molecular sieve materials can include all aluminosilicate, borosilicate, gallosilicate, MeAPSO, and MeAPO compositions. These include, but are not limited to SSZ-13, SSZ-62, natural chabazite, zeolite K-G, Linde D, Linde R, LZ-218, LZ-235. LZ-236, ZK-14, SAPO-34, SAPO-44, SAPO-47, ZYT-6, CuSAPO-34, CuSAPO-44, and CuSAPO-47.

The ratio of silica to alumina of an aluminosilicate molecular sieve component can vary over a wide range. In one or more embodiments, the first and second molecular sieve materials, independently, have a silica to alumina molar ratio (SAR) in the range of about 2 to about 300, including about 5 to about 250; about 5 to about 200; about 5 to about 100; and about 5 to about 50. In one or more specific embodiments, the first and second molecular sieve materials, independently, have a silica to alumina molar ratio (SAR) in the range of about 10 to about 200, about 10 to about 100, about 10 to about 75, about 10 to about 60, and about 10 to about 50; about 15 to about 100, about 15 to about 75, about 15 to about 60, and about 15 to about 50; about 20 to about 100, about 20 to about 75, about 20 to about 60, and about 20 to about 50.

The particle size of the zeolite can vary. Generally the particle size of CHA zeolite can be characterized by a D90 particle size of about 1 to about 40 microns, preferably about 10 to about 30 microns, more preferably 10 microns to about 20 microns. D90 is defined as the particle size at which 90% of the particles have a finer particle size.

As used herein, the term "promoted" refers to a component that is intentionally added to the molecular sieve material, as opposed to impurities inherent in the molecular sieve. Thus, a promoter is intentionally added to enhance activity of a catalyst compared to a catalyst that does not have promoter intentionally added. In order to promote the SCR of oxides of nitrogen, in one or more embodiments, one or more suitable metal(s) is independently exchanged into the first and second molecular sieve. According to one or more embodiments, the first molecular sieve is promoted with iron, or a combination of iron and copper, and the second molecular sieve is promoted with copper, or a combination of copper and iron. In order for the molecular sieve material to be promoted with a metal the metal is ion-exchanged with the molecular sieve. Hence, the terms "metal promoted" and "metal ion-exchanged" have the same meaning and can be used interchangeably.

The promoter metal content of the catalyst, calculated as the oxide, is, in one or more embodiments, at least about 0.1 wt. % based on the total weight of the calcined metal ion-exchanged molecular sieve, reported on a volatile-free basis. In specific embodiments, the promoter metal of the first molecular sieve material comprises Fe, and the Fe content, calculated as $Fe_2O_3$ is in the range of about 0.1 wt. % up to about 10 wt. %, including about 9, about 8, about 7, about 6, about 5, about 4, about 3, about 2, about 1, about 0.5, about 0.25, and about 0.1 wt. %, in each case based on the total weight of the calcined metal ion-exchanged molecular sieve reported on a volatile free basis. In specific embodiments, the Fe content of the first molecular sieve material, calculated as $Fe_2O_3$, is in the range of about 1 to about 10 wt. % based on the total weight of the calcined metal-ion exchanged molecular sieve material, including about 1 to about 5 wt. % based on the total weight of the calcined metal-ion exchanged molecular sieve material.

In specific embodiments, the promoter metal of the second molecular sieve material comprises Cu, and the Cu content, calculated as CuO is in the range of about 0.1 wt. % to about 5 wt. %, including about 5, about 4, about 3, about 2, about 1, about 0.5, about 0.25, and about 0.1 wt. %, in each case based on the total weight of the calcined metal-ion exchanged molecular sieve material reported on a volatile free basis. In specific embodiments, the Cu content of the second molecular sieve material, calculated as CuO, is in the range of about 2 to about 5 wt. % based on the total weight of the calcined metal-ion exchanged molecular sieve material.

In one or more embodiments, different catalyst systems are prepared using selective catalytic articles comprising a first molecular sieve material promoted with iron and second molecular sieve material promoted with copper. Relevant designs for the SCR articles disclosed herein include zoned and layered selective catalytic reduction articles.

In some embodiments, the upstream zone is zoned itself into an upstream zone comprising an iron-promoted molecular sieve and a downstream zone comprising a copper-promoted molecular sieve, wherein the upstream and downstream zones are coated onto the first substrate. In some embodiment, the upstream zone comprising the iron-promoted molecular sieves is coated onto the substrate in a range of about 1% to about 99%, preferably about 25% to about 75%, more preferably about 30% to about 70% of the axial length of the first substrate.

Likewise, in some embodiments, the downstream zone is zoned itself into an upstream zone comprising an iron-promoted molecular sieve and a downstream zone comprising a copper-promoted molecular sieve, wherein the upstream and downstream zones are coated onto the second substrate. In some embodiment, the downstream zone comprising the copper-promoted molecular sieves is coated onto the substrate in a range of about 1% to about 99%, preferably about 25% to about 75%, more preferably about 30% to about 70% of the axial length of the second substrate.

In one or more embodiments, the iron-promoted first molecular sieve material and the copper-promoted second molecular sieve material are arranged as two separate zones in an axially zoned configuration. As used herein, the term "axially zoned" refers to the location of the upstream zone and downstream zone relative to one another. Axially means side-by-side such that the upstream zone and the downstream zone are located one beside the other. As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

In one or more embodiments, the selective catalytic reduction article is in an axially zoned configuration wherein the iron-promoted first molecular sieve material is coated on a substrate upstream of the copper-promoted molecular sieve material (which may be on the same substrate or a separate substrate). According to one or more embodiments, the axially zoned iron-promoted first molecular sieve material and the copper-promoted second molecular sieve material can be arranged on the same or a common substrate or on different substrates separated from each other. When a common substrate is used the amount of iron-promoted first molecular sieve material coated onto such substrate may be in the range of about 1% to about 95%, more preferably, about 25% to about 75%, even more preferably about 30% to about 65% of the axial length of the substrate. Referring to FIG. 2A, an exemplary embodiment of an axially zoned system is shown. The catalytic article 10 is shown in an axially zoned arrangement where the iron-promoted first molecular sieve material in upstream zone 18 is located upstream of the copper-promoted second molecular sieve material in downstream zone 20 on a substrate 12. The substrate 12 has an inlet end 22 and an outlet end 24 defining an axial length L. In one or more embodiments, the substrate 12 generally comprises a plurality of channels 14 of a honeycomb substrate, of which only one channel is shown in cross-section for clarity. The iron-promoted first molecular sieve material in upstream zone 18 extends from the inlet end 22 of the substrate 12 through less than the entire axial length L of the substrate 12. The length of the upstream zone 18 is denoted as first zone length 18a in FIG. 2A. The copper-promoted second molecular sieve material in downstream zone 20 extends from the outlet end 24 of the substrate 12 through less than the entire axial length L of the substrate 12. The length of the downstream zone 20 is denoted as the second zone length 20a in FIG. 2A.

In one or more embodiments, as illustrated in FIG. 2A, the upstream zone 18 comprising the iron-promoted first molecular sieve material is directly abutting the downstream zone 20 comprising the copper-promoted second molecular sieve material.

Figure 2B:
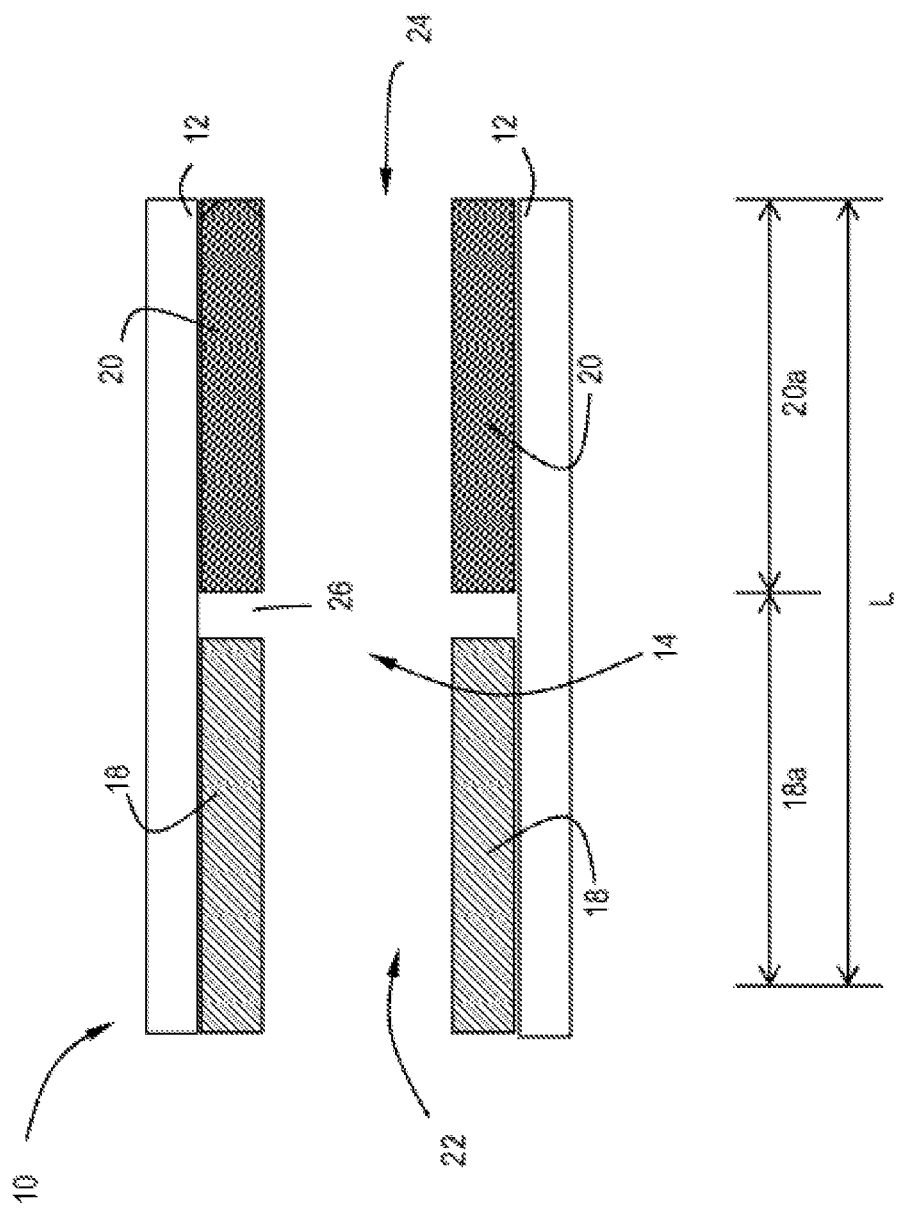
FIG. 2B shows a partial cross-sectional view of catalytic article according to one or more embodiments.

Referring to FIG. 2B, in other embodiments, the upstream zone 18 comprising the iron-promoted first molecular sieve material is separated by a gap 26 from the downstream zone 20 comprising the copper-promoted second molecular sieve material.

It will be appreciated that the length of the upstream zone 18 and the downstream zone 20 can be varied. In one or more embodiments, the upstream zone 18 and the downstream zone 20 can be equal in length. In other embodiments, the upstream zone 18 can be in the range of about 10% to 90%, or about 20% to about 80% of the length L of the substrate 12, with the downstream zone 20 respectively covering the remainder of the length L of the substrate, as depicted in FIG. 2A. In other embodiments, the upstream zone 18 can be about 10%, about 15%, about 20%, about 25%, about 30%, about 35%, about 40%, about 45%, about 50%, about 55%, about 60%, about 65%, about 70%, about 75%, about 80%, about 85%, or about 90% of the length L of the substrate 12, with the downstream zone 20 respectively covering the remainder of the length L of the substrate, with a gap 26, as depicted in FIG. 2B.

Figure 4:
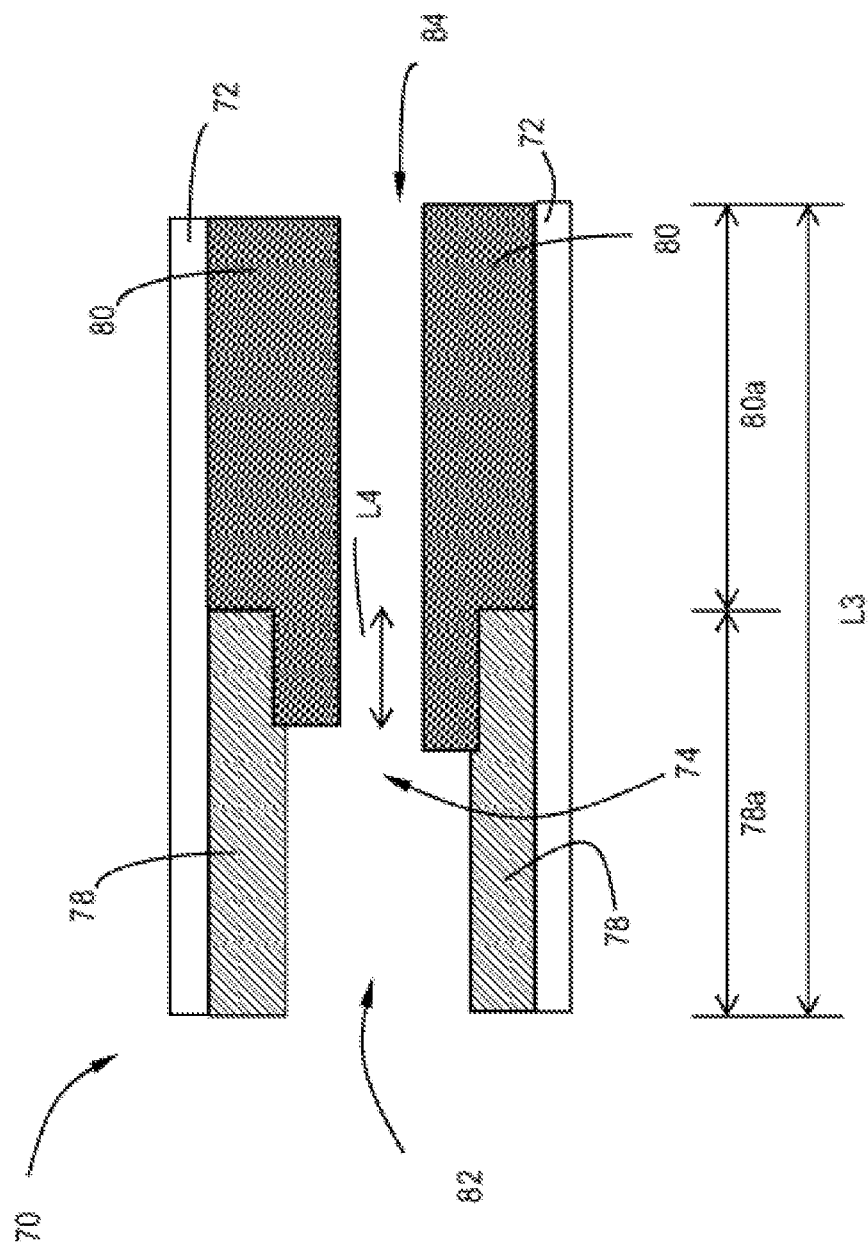
FIG. 4 shows a partial cross-sectional view of catalytic article according to one or more embodiments.

It will also be appreciated by one skilled in the art that the upstream zone and downstream zone can be at least partially overlapping. As used herein, the term "at least partially overlapping" means that the upstream zone and the downstream zone can overlap by an amount in the range of at least about 0.1% to at least about 99%. In one or more embodiments, the upstream zone and the downstream zone can be completely overlapping (e.g., about 100%). In one or more embodiments, the upstream zone comprising the iron-promoted first molecular sieve material is partially overlapping the downstream zone comprising the copper-promoted second molecular sieve material. Referring to FIG. 3, an exemplary embodiment of an axially zoned system is shown. The catalytic article 40 is shown in an axially zoned arrangement where the iron-promoted first molecular sieve material in an upstream zone 48 is located upstream of the copper-promoted second molecular sieve material in a downstream zone 50 on a substrate 42. The substrate 42 has an inlet end 51 and an outlet end 55 defining an axial length L1. In one or more embodiments, the substrate 42 generally comprises a plurality of channels 44 of a honeycomb substrate, of which only one channel is shown in cross-section for clarity. The iron-promoted first molecular sieve material in upstream zone 48 extends from the inlet end 51 of the substrate 42 through less than the entire axial length L1 of the substrate 42 and partially overlapping the downstream zone 50 comprising the copper-promoted second molecular sieve material. The length of the iron-promoted first molecular sieve material in upstream zone 48 is denoted as first zone length 48a in FIG. 3. The copper-promoted second molecular sieve material in downstream zone 50 extends from the outlet end 55 of the substrate 42 through less than the entire axial length L1 of the substrate 42. The length of the copper-promoted second molecular sieve material in downstream zone 50 is denoted as the second zone length 50a in FIG. 3. The length of the at least partial overlap is denoted as L2 in FIG. 3. In other embodiments, the downstream zone comprising the copper-promoted second molecular sieve material is at least partially overlapping the upstream zone comprising the iron-promoted first molecular sieve material. In one or more embodiments, the downstream zone comprising the copper-promoted second molecular sieve material is partially overlapping the upstream zone comprising the iron-promoted first molecular sieve material in a range of at least about 0.1% to at least about 99%. In one or more embodiments, the downstream zone comprising the copper-promoted molecular sieve material is completely overlapping the upstream zone comprising the iron-promoted first molecular sieve material. Referring to FIG. 4, an exemplary embodiment of an axially zoned system is shown. The catalytic article 70 is shown in an axially zoned arrangement where the iron-promoted first molecular sieve material in upstream zone 78 is located upstream of the copper-promoted second molecular sieve material in downstream zone 80 on a substrate 72. The substrate 72 has an inlet end 82 and an outlet end 84 defining an axial length L3. In one or more embodiments, the substrate 72 generally comprises a plurality of channels 74 of a honeycomb substrate, of which only one channel is shown in cross-section for clarity. The iron-promoted first molecular sieve material in upstream zone 78 extends from the inlet end 82 of the substrate 72 through less than the entire axial length L3 of the substrate 72. The length of the iron-promoted first molecular sieve material in upstream zone 78 is denoted as first zone length 78a in FIG. 4. The copper-promoted second molecular sieve material in downstream zone 80 extends from the outlet end 84 of the substrate 72 through less than the entire axial length L3 of the substrate 72, and partially overlapping the upstream zone 78 comprising the iron-promoted first molecular sieve material. The length of the copper-promoted second molecular sieve material in downstream zone 80 is denoted as the second zone length 80a in FIG. 4. The length of the at least partial overlap is denoted as L4 in FIG. 4. As mentioned previously, the amount of partial overlap denoted as L4 can be in the range of at least about 0.1% to at least about 99% of axial length L3.

Figure 5:
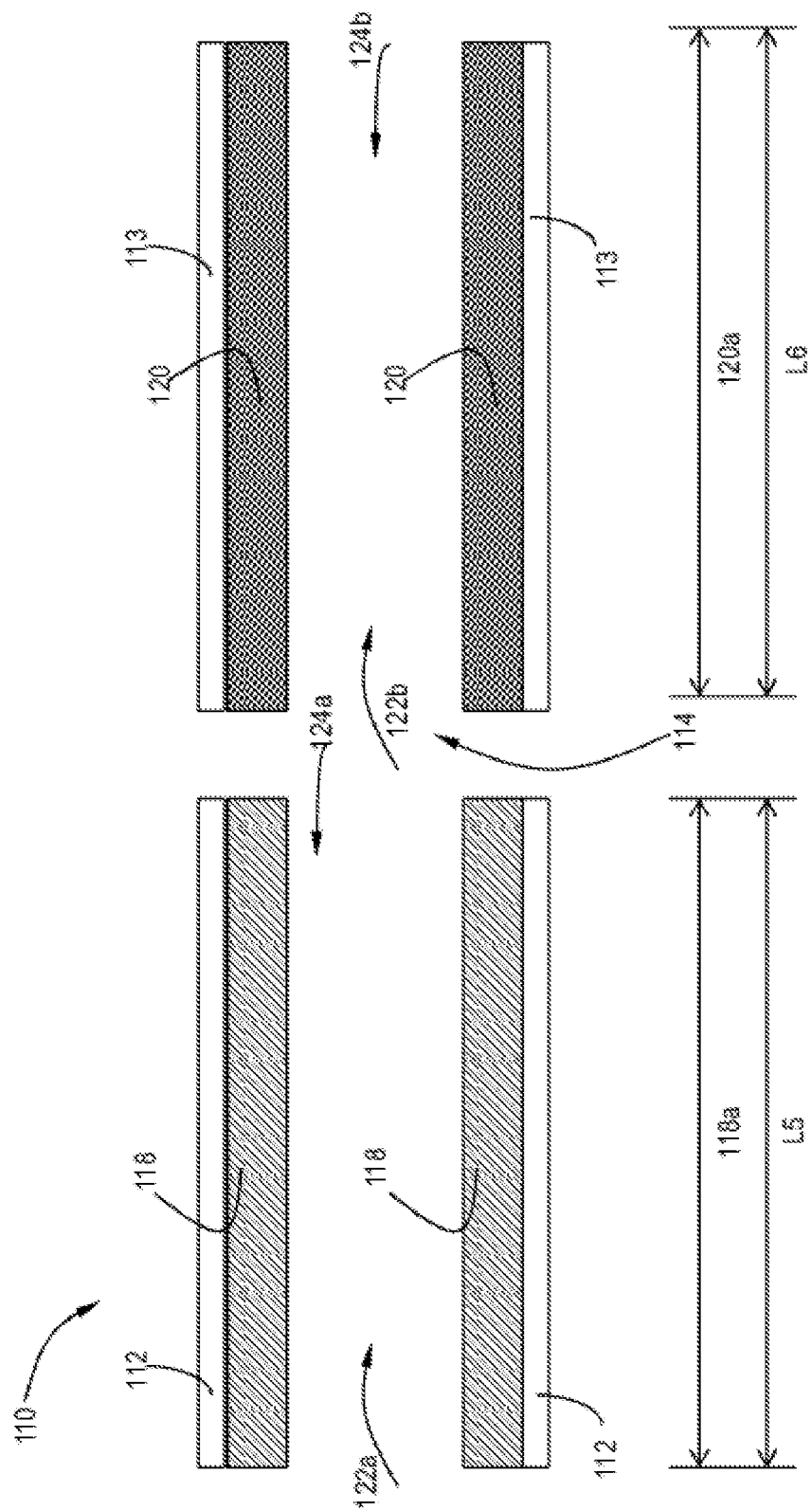
FIG. 5 shows a partial cross-sectional view of catalytic article according to one or more embodiments.

Referring to FIG. 5, another embodiment of an axially zoned catalytic article 110 is shown. The catalytic article 110 shown is an axially zoned arrangement where the iron-promoted first molecular sieve material in upstream zone 118 is located upstream of the copper-promoted second molecular sieve material in downstream zone 120 on separate substrates, a first substrate 112 and a second substrate 113. The iron-promoted first molecular sieve material in upstream zone 118 is coated on a first substrate 112, and the copper-promoted second molecular sieve material in downstream zone 120 is coated on a separate second substrate 113. The first and second substrates 112 and 113 can be comprised of the same material or a different material. The first substrate 112 has an inlet end 122a and an outlet end 124a defining an axial length L5. The second substrate 113 has an inlet end 122b and an outlet end 124b defining an axial length L6. In one or more embodiments, the first and second substrates 112 and 113 generally comprise a plurality of channels 114 of a honeycomb substrate, of which only one channel is shown in cross-section for clarity. The iron-promoted first molecular sieve material in upstream zone 118 extends from the inlet end 122a of the first substrate 112 through the entire axial length L5 of the first substrate 112 to the outlet end 124a. The length of the iron-promoted first molecular sieve in upstream zone 118 is denoted as first zone length 118a in FIG. 5. The copper-promoted second molecular sieve material in downstream zone 120 extends from the outlet end 124b of the second substrate 113 through the entire axial length L6 of the second substrate 113 to the inlet end 122b. The copper-promoted second molecular sieve material in downstream zone 120 defines a second zone length 120a in FIG. 5. The length of the zones 118a and 120a can be varied as described with respect to FIG. 5.

Figure 23:
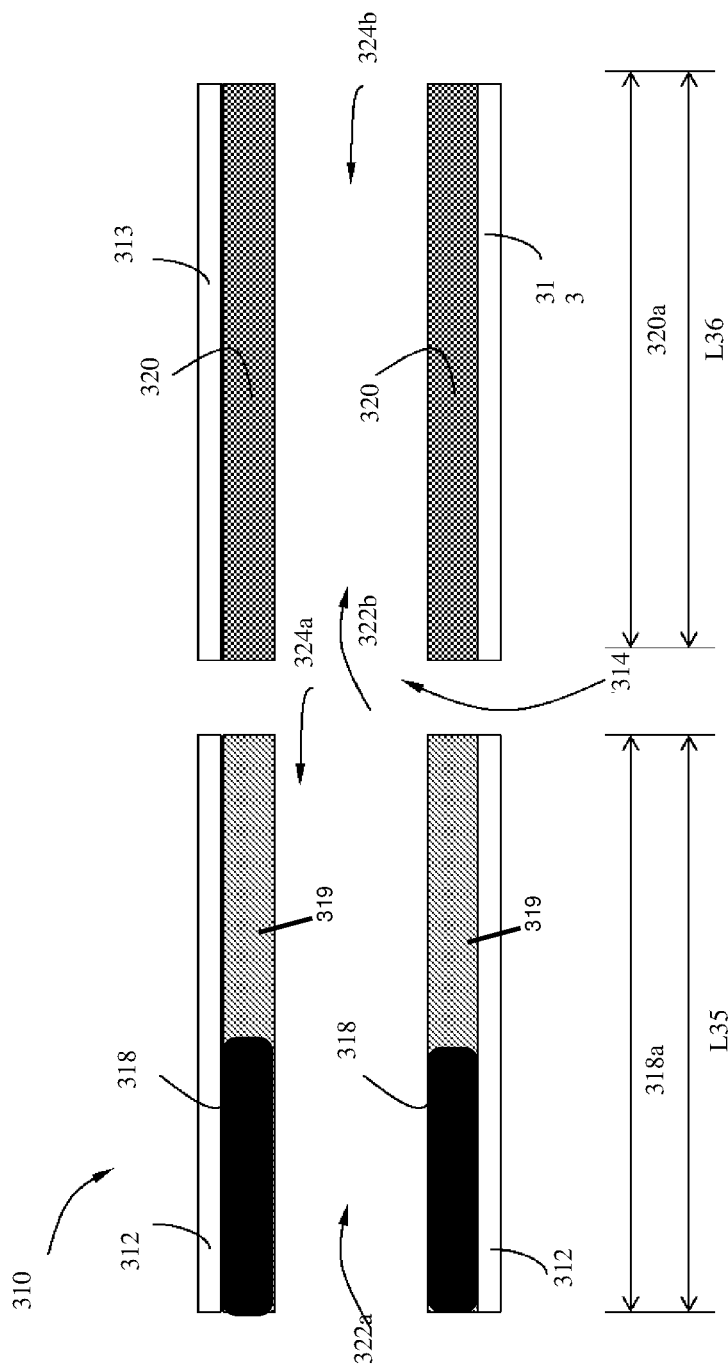
FIG. 23 shows a partial cross-sectional view of a zoned catalytic article according to one or more embodiments.

Referring to FIG. 23, another embodiment of an axially zoned catalytic article 310 is shown. The catalytic article 310 shown is an axially zoned arrangement where the upstream zone is zoned into an upstream zone 318 comprising iron-promoted first molecular sieve material and a downstream zone 319 comprising copper-promoted second molecular sieve material. The downstream zone 320 of the catalytic article 310 comprises a copper-promoted second molecular sieve material. The copper-promoted second molecular sieve material in downstream zone 320 is on a separate substrate, such that the catalytic article 310 comprises a first substrate 312 and a second substrate 313. The iron-promoted molecular sieves in zoned upstream zone 318 and the copper-promoted molecular sieves zoned in downstream zone 319 are both coated on a first substrate 312, and the copper-promoted second molecular sieve material in downstream zone 320 is coated on a separate second substrate 313. The upstream zone 318 can be zoned such that about 1% to about 95% of the axial length L35 of substrate 312 comprises iron-promoted first molecular sieve material. The first and second substrates 312 and 313 can be comprised of the same material or a different material. The first substrate 312 has an inlet end 322a and an outlet end 324a defining an axial length L35. The second substrate 313 has an inlet end 322b and an outlet end 324b defining an axial length L36. In one or more embodiments, the first and second substrates 312 and 313 generally comprise a plurality of channels 314 of a honeycomb substrate, of which only one channel is shown in cross-section for clarity. The iron-promoted first molecular sieve material in upstream zone 318 extends from the inlet end 322a of the first substrate 312 through a portion of the axial length L35 of the first substrate 312 to the outlet end 324a as previously described. The length of the iron/copper-promoted molecular sieves in zoned upstream zone 318/319 is denoted as first zone length 318a in FIG. 23. The copper-promoted second molecular sieve material in downstream zone 320 extends from the outlet end 324b of the second substrate 313 through the entire axial length L36 of the second substrate 313 to the inlet end 322b. The copper-promoted second molecular sieve material in downstream zone 320 defines a second zone length 320a in FIG. 23. The length of the zone 318a and 320a can be varied as described previously.

Figure 24:
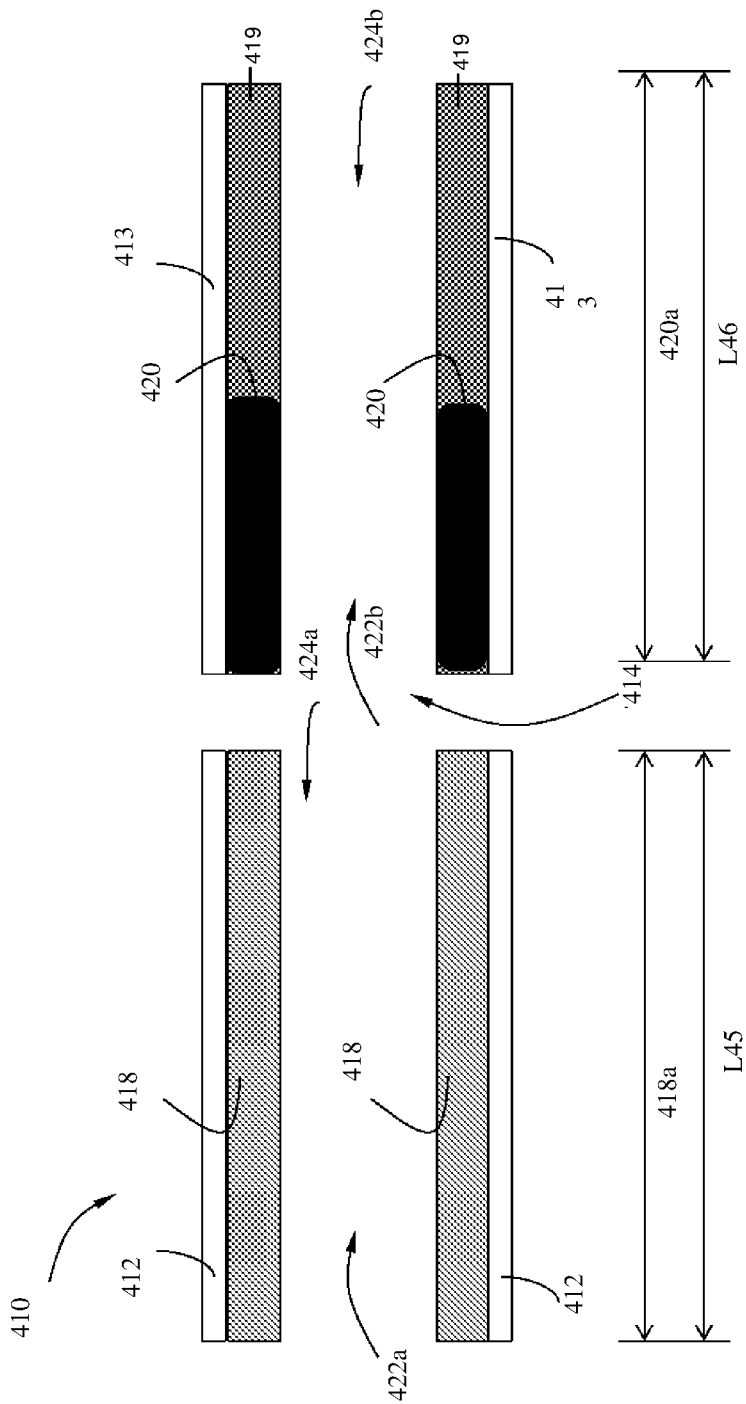
FIG. 24 shows a partial cross-sectional view of a zoned catalytic article according to one or more embodiments.

Likewise, referring to FIG. 24, another embodiment of an axially zoned catalytic article 410 is shown. The catalytic article 410 shown is an axially zoned arrangement where the downstream zone is zoned into an upstream zone 420 comprising iron-promoted first molecular sieve material and a downstream zone 419 comprising copper-promoted second molecular sieve material. The upstream zone 418 of the catalytic article 410 comprises an iron-promoted first molecular sieve material. The upstream zone 418 on a separate substrate, such that the catalytic article 410 comprises a first substrate 412 and a second substrate 413. The iron-promoted molecular sieves in upstream zone 420 and the copper-promoted molecular sieves in downstream zone 419 are coated on a second substrate 413, and the iron-promoted first molecular sieve material in upstream zone 418 is coated on a separate first substrate 412. The downstream zone 420 can be zoned such that at about 1% to about 95% of the axial length L46 of substrate 413 comprises an iron-promoted first molecular sieve material. The first and second substrates 412 and 413 can be comprised of the same material or a different material. The first substrate 412 has an inlet end 422*a* and an outlet end 424*a* defining an axial length L45. The second substrate 413 has an inlet end 422*b* and an outlet end 424*b* defining an axial length L46. In one or more embodiments, the first and second substrates 412 and 413 generally comprise a plurality of channels 414 of a honeycomb substrate, of which only one channel is shown in cross-section for clarity. The iron-promoted first molecular sieve material in upstream zone 418 extends from the inlet end 422*a* of the first substrate 412 through the entire axial length L45 of the first substrate 412 to the outlet end 424*a*. The length of the iron-promoted molecular sieves in upstream zone 418 is denoted as first zone length 418*a* in FIG. 24. The iron/copper-promoted second molecular sieve material in zoned zone 419/420 extends from the outlet end 424*b* of the second substrate 413 through the entire axial length L46 of the second substrate 413 to the inlet end 422*b*. The iron/copper-promoted second molecular sieve material in zoned downstream zone 420 defines a second zone length 420*a* in FIG. 24. The length of the zone 418*a* and 420*a* can be varied as described previously with respect to FIG. 24.

Figure 6:
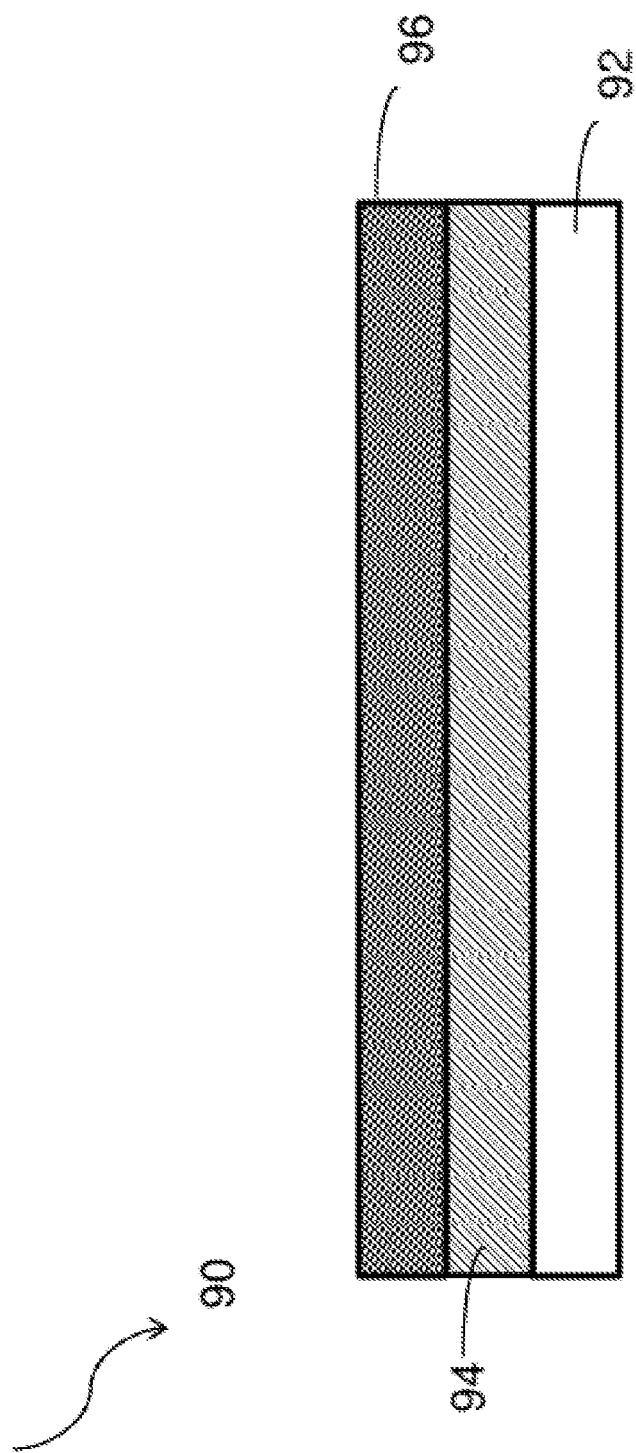
FIG. 6 shows a partial cross-sectional view of catalytic article according to one or more embodiments.

In further embodiments, the catalyst system is a layered article. Referring to FIG. 6, in one or more embodiments, the catalyst system comprises a layered article 90, where a substrate 92 is wash coated with the copper-promoted second molecular sieve material to form a first layer (or a bottom wash coat layer) 94, and the iron-promoted first molecular sieve material is wash coated on top of the first layer to form a second layer (or top wash coat layer) 96. It will be appreciated by one of skill in the art that the top wash coat/second layer is upstream of the bottom wash coat/first layer, such that the top wash coat/second layer is the upstream zone and the bottom wash coat/first layer is the downstream zone.

In one or more embodiments, the catalyst material (i.e., metal promoted molecular sieve material) can be applied to the substrate (e.g., a flow-through honeycomb monolith) as a wash coat. A wash coat is formed by preparing a slurry containing a specified solids content (e.g., 30-90% by weight) of catalyst material in a liquid vehicle (e.g., water), which is then coated onto a substrate and dried to provide a wash coat layer. As used herein, the term "wash coat" has its usual meaning in the art of a thin, adherent coating of a catalytic or other material applied to a substrate material, such as a honeycomb-type carrier member, which is sufficiently porous to permit the passage of the gas stream being treated. As mentioned previously the slurry is formed by mixing the catalyst material with water to form a slurry containing a specified solids content (e.g., about 30-90% by weight) of catalyst material. In addition to the catalyst material, the slurry may optionally contain alumina as a binder, water-soluble or water-dispersible stabilizers (e.g., barium acetate), promoters (e.g., lanthanum nitrate), associative thickeners, and/or surfactants (including anionic, cationic, non-ionic or amphoteric surfactants). It is advantageous to avoid the addition of acids to the slurry in order to avoid the formation of dissociated metal components or related metal species that could lead to alloying within the catalyst material. Accordingly, in certain embodiments, the slurry used to coat the catalyst substrate can be substantially or completely acid-free.

When present, the alumina binder is typically used in an amount of about 0.05 g/in$^3$ to about 1 g/in$^3$. The alumina binder can be, for example, boehmite, gamma-alumina, or delta/theta alumina.

The slurry can be milled to enhance mixing of the particles and formation of a homogenous material. The milling can be accomplished in a ball mill, continuous mill, or other similar equipment, and the solids content of the slurry may be, e.g., about 20 to about 60 wt. %, more particularly about 30 to about 40 wt. %. In one embodiment, the post-milling slurry is characterized by a D90 particle size of about 20 to about 30 microns. The D90 is defined as the particle size at which 90% of the particles have a finer particle size.

The slurry is then coated on the catalyst substrate using a washcoat technique known in the art and described further below.

As used herein, the term "substrate" or "substrate carrier" refers to the monolithic material onto which the catalyst material is placed, typically in the form of a washcoat as described above. In one or more embodiments, the substrate is a ceramic or metal having a honeycomb structure. Any suitable substrate may be employed, such as a monolithic substrate of the type having fine, parallel gas flow passages extending there through from an inlet or an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section, more usually from about 300 to about 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used a wall-flow filter substrates. However, it will be understood that the invention is not limited to a particular substrate type, material, or geometry. Note that where the substrate is a wall-flow substrate, the catalyst article (i.e. SCR catalyst) composition can permeate into the pore structure of the porous walls (i.e., partially or fully occluding the pore openings) in addition to being coated on the surface of the walls. The metallic substrate may include any metallic substrate, such as those with openings or "punch-outs" in the channel walls.

The ceramic substrate may be made of any suitable refractory material, e.g. cordierite, cordierite-α-alumina, silicon nitride, zircon mullite, spodumene, alumina-silicamagnesia, zircon silicate, sillimanite, a magnesium silicate, zircon, petalite, α-alumina, an aluminosilicate and the like.

The substrates useful for the catalyst materials of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to about 25 wt. % chromium, about 1 to about 8 wt. % of aluminum, and about 0 to about 20 wt. % of nickel.

In one or more embodiments, the upstream zone and/or downstream zone are coated on a high porosity ceramic honeycomb flow through support. The high porosity ceramic honeycomb flow through support can have the following properties: a large fraction of interconnected pores; the porosity of wall material is greater than about 50% and up to about 70% porosity; a mean pore size greater than about 20 microns, for example, greater than about 25 microns, more specifically greater than about 30 microns, and more particularly greater than about 40 microns but less than about 100 microns; and a broad pore size distribution.

In one or more embodiments, the selective catalytic reduction article comprises the upstream iron-promoted first molecular sieve material and/or the downstream copper-promoted second molecular sieve material is coated on a wall-flow filter. As recognized by one skilled in the art, when the selective catalytic reduction article is coated on a wall-flow filter, the result is SCR on Filter. In one or more specific embodiments, the upstream zone comprising iron-promoted first molecular sieve material is coated on a wall-flow filter, such as to produce an SCR on Filter (SCRoF), and the downstream zone comprising copper-promoted second molecular sieve material is coated on a flow through monolith. In other embodiments, both the upstream zone and the downstream zone are coated on a wall-flow filter. In such embodiments where both the upstream zone and the downstream zone are coated on a wall-flow filter, the upstream zone and the downstream zone can be coated on a single wall-flow filter, or the upstream zone and the downstream zone can be coated on separate wall-flow filters so that two modified substrates (i.e., bricks) are present in the exhaust gas treatment system.

Figure 7B:
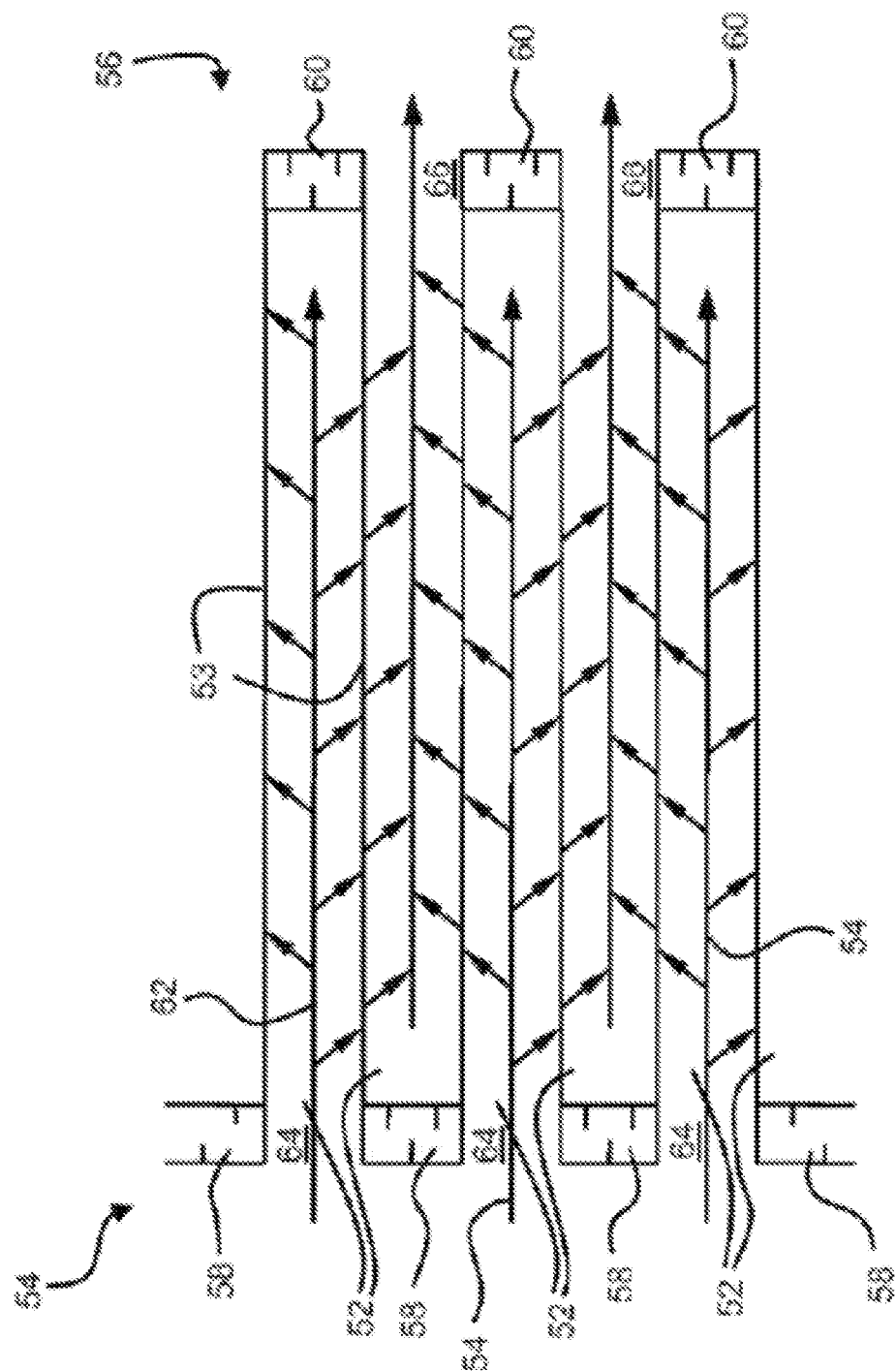
FIG. 7B shows a cross-sectional view of a section of a wall flow filter substrate.

FIGS. 7A and 7B illustrate a wall flow filter substrate 130 which has a plurality of passages 52. The passages are tubularly enclosed by the channel walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet end 54 and outlet end 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

To coat both the iron-promoted first molecular sieve material and the copper-promoted second molecular sieve material onto the wall-flow filter substrate, the iron-promoted first molecular sieve material is coated up-stream in the exhaust gas flow to the copper-promoted second molecular sieve material. This can be accomplished in several ways, including, but not limited to: (1) Coat the iron-promoted first molecular sieve material onto the inlet channels in a way to keep the concentration gradient for iron-promoted first molecular sieve material near to or at the inlet wall surface and the copper-promoted second molecular sieve coated onto the outlet channels in a way to keep the concentration gradient for copper-promoted second molecular sieve material near to or at the outlet wall surface. This could allow for some mixing of iron-promoted first molecular sieve material and copper-promoted second molecular sieve material across the center of the wall thickness; (2) coat the iron-promoted first molecular sieve material onto the inlet channels and allow the washcoating to penetrate through-out the wall (there will always be some gradient), then coat the copper-promoted second molecular sieve material onto the outlet channel wall surface so as not to penetrate too much into the filter wall. Of course this will require good adhesion of the copper-promoted second molecular sieve material to the outlet wall so as not to have it erode or blow off in the exhaust flow; (3) coat the copper-promoted second molecular sieve material onto the outlet channels so as to penetrate through-out the filter wall. This could also be done from on the inlet channels but one needs to achieve good penetration of the copper-promoted second molecular sieve material into the filter wall, then apply the iron-promoted first molecular sieve to the inlet channels so as to form a layer on the inlet channel wall and not penetrate (much) into the wall porosity of the filter; (4) coat the iron-promoted first molecular sieve material onto the inlet channels to a depth that is less than the full length of the filter substrate. The copper-promoted second molecular sieve material would be coated onto the outlet channels to a depth that is less than the full length of the filter substrate. The inlet iron-promoted first molecular sieve material and outlet copper-promoted second molecular sieve zones could be varied in length and could (a) abut one another, (b) overlap one another or (c) have a gap between the zones; (5) two filter substrates can be arranged in parallel, and the first filter substrate is coated with the iron-promoted first molecular sieve material, and the second downstream filter substrate is coated with copper-promoted second molecular sieve material; 6) coat the iron-promoted first molecular sieve material onto the outlet channel allowing it to penetrate into the wall, then coat the copper-promoted second molecular sieve material onto the outlet minimizing penetration into the wall.

In one or more embodiments, wall flow filter substrates are composed of ceramic-like materials such as cordierite, α-alumina, silicon carbide, silicon nitride, zirconia, mullite, spodumene, alumina-silica-magnesia or zirconium silicate, or of porous, refractory metal. In other embodiments, wall flow substrates are formed of ceramic fiber composite materials. In specific embodiments, wall flow substrates are formed from cordierite and silicon carbide. Such materials are able to withstand the environment, particularly high temperatures, encountered in treating the exhaust streams.

In one or more embodiments, wall flow substrates include thin porous walled honeycombs monoliths through which the fluid stream passes without causing too great an increase in back pressure or pressure across the article. Normally, the presence of a clean wall flow article will create a back pressure of about 1 inch water column to about 10 psig. Ceramic wall flow substrates used in the system are formed of a material having a porosity of at least about 50% (e.g., from about 50 to about 75%) having a mean pore size of at least about 5 microns (e.g., from about 5 to about 30 microns). In one or more embodiments, the substrates have a porosity of at least about 55% and have a mean pore size of at least about 10 microns. When substrates with these porosities and these mean pore sizes are coated with the techniques described below, adequate levels of catalyst compositions can be loaded onto the substrates to achieve excellent $NO_x$ conversion efficiency. These substrates are still able to retain adequate exhaust flow characteristics, i.e., acceptable back pressures, despite the SCR catalyst loading. U.S. Pat. No. 4,329,162 is herein incorporated by reference with respect to the disclosure of suitable wall flow substrates.

Typical wall flow filters in commercial use are formed with lower wall porosities, e.g., from about 35% to about 50%, than the wall flow filters utilized in the invention. In general, the pore size distribution of commercial wall flow filters is typically very broad with a mean pore size smaller than about 17 microns.

The porous wall flow filter used in one or more embodiments is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic materials and combinations of one or more layers of catalytic materials on the inlet and/or outlet walls of the element.

To coat the wall flow substrates with the catalyst material of one or more embodiments, the substrates are immersed vertically in a portion of the slurry containing the catalyst material such that the top of the substrate is located just above the surface of the slurry. In this manner the slurry contacts the inlet face of each honeycomb wall, but is prevented from contacting the outlet face of each wall. The sample substrate is left in the slurry for about 30 seconds. The substrate is then removed from the slurry, and excess slurry is removed from the wall flow substrate first by allowing it to drain from the channels using gravity, then by blowing with compressed air (against the direction of slurry penetration), and then by pulling a vacuum from the direction of slurry penetration. By using this technique, the slurry can permeate the walls of the substrate, yet the pores are not occluded to the extent that undue back pressure will build up in the finished substrate. As used herein, the term "permeate" when used to describe the dispersion of the slurry containing the catalyst material on the substrate, means that the catalyst material is dispersed throughout the wall of the substrate.

The coated substrates are dried typically at about 100° C. and calcined at a higher temperature (e.g., about 300° C. to about 450° C.). In describing the quantity of washcoat or catalytic metal components or other components of the composition, it is convenient to use units of weight of component per unit volume of catalyst substrate. Therefore, the units, grams per cubic inch ("$g/in^3$") and grams per cubic foot ("$g/ft^3$"), are used herein to mean the weight of a component per volume of the substrate, including the volume of void spaces of the substrate. Other units of weight per volume such as g/L are also sometimes used. The total loading of the catalyst material (i.e., ion-exchanged metal on molecular sieve material) on the substrate, such as a monolithic flow-through substrate, is typically from about 0.5 to about 6 $g/in^3$, and more typically from about 1 to about 5 $g/in^3$. After calcining, the catalyst loading can be determined through calculation of the coated and uncoated weights of the substrate. As will be apparent to those of skill in the art, the catalyst loading can be modified by altering the solids content of the coating slurry. Alternatively, repeated immersions of the substrate in the coating slurry can be conducted, followed by removal of the excess slurry as described above.

In one or more embodiments, the exhaust gas treatment system further comprises a soot filter upstream of the SCR catalyst system and downstream of the engine. The catalyst system is disposed downstream of a soot filter, and the soot filter may be catalyzed or non-catalyzed.

In one or more embodiments, the system can further comprise a diesel oxidation catalyst located downstream of the engine. In specific embodiments, the diesel oxidation catalyst is located upstream of the catalyst system of one or more embodiments. In other specific embodiments, both a diesel oxidation catalyst and a catalyzed soot filter are located upstream from the SCR catalyst system of one or more embodiments.

In one or more embodiments, an ammonia oxidation catalyst may be provided downstream of the SCR catalyst system of one or more embodiments to remove any slipped ammonia from the exhaust gas treatment system. In specific embodiments, the AMOx catalyst may comprise a platinum group metal (PGM) such as platinum, palladium, rhodium, or combinations thereof. In one or more embodiments, the AMOx catalyst may comprise a bottom coat with PGM and a top coat with SCR functionality.

Such AMOx catalysts are useful in exhaust gas treatment systems, which already include an SCR catalyst. As discussed in commonly assigned U.S. Pat. No. 5,516,497, the entire content of which is incorporated herein by reference, a gaseous stream containing oxygen, nitrogen oxides, and ammonia can be sequentially passed through a first and a second catalyst, the first catalyst favoring reduction of nitrogen oxides and the second catalyst favoring the oxidation or decomposition of excess ammonia. Thus, the first catalyst can be the SCR catalytic article according to one or more embodiments of the invention comprising an upstream zone including an iron-promoted first molecular sieve material and a downstream zone including a copper-promoted second molecular sieve material, and the second catalyst can be an AMOx catalyst and/or a combination of an SCR and AMOx integrated catalyst, optionally comprising a zeolite.

AMOx catalyst composition(s) can be coated on a flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

Preparation of Catalyst:

Synthesis of CHA-Type Molecular Sieves

A molecular sieve having the CHA structure may be prepared according to various techniques known in the art, for example U.S. Pat. No. 4,544,538 (Zones) and U.S. Pat. No. 6,709,644 (Zones), which are herein incorporated by reference in their entireties. It is noted that these molecular sieves are known to have a particle size of less than 0.5 microns.

Optionally $NH_4$-Exchange to Form $NH_4$-CHA:

Optionally, the obtained alkali metal zeolite is $NH_4$-exchanged to form $NH_4$-CHA. The $NH_4$— ion exchange can be carried out according to various techniques known in the art, for example Bleken, F.; Bjorgen, M.; Palumbo, L.; Bordiga, S.; Svelte, S.; Lillerud, K.-P.; and Olsbye, U. Topics in Catalysis 52, (2009), 218-228.

Copper-Exchange or Iron-Exchange into Alkali Metal or $NH_4$-CHA to Form Metal-CHA:

Copper or iron ions are ion exchanged into alkali metal or $NH_4$ molecular sieves. In specific embodiments, copper or iron ions are ion exchanged into alkali metal or $NH_4$-CHA to form Cu-CHA or Fe-CHA. When copper acetate is used, the copper concentration of the liquid copper solution used in the copper ion-exchange is in specific embodiments in the range from about 0.01 to about 0.4 molar, more specifically in the range from about 0.05 to about 0.3 molar, even more specifically in the range from about 0.1 to about 0.25 molar, even more specifically in the range from about 0.125 to about 0.25 molar, even more specifically in the range from about 0.15 to about 0.225 molar.

According to an embodiment of the present invention, the molecular sieve materials of the invention are used in a catalytic process. In general, the catalyst system and catalytic articles of the invention can be used in any conceivable catalytic process, wherein processes involving the conversion of at least one organic compound, more specifically of organic compounds comprising at least one carbon-carbon and/or carbon-oxygen and/or carbon-nitrogen bond, more specifically of organic compounds comprising at least one carbon-carbon and/or carbon-oxygen bond, and even more specifically of organic compounds comprising at least one carbon-carbon bond. In particularly specific embodiments of the present invention, catalyst systems and catalytic articles can be used to catalyze any one or more of methanol-to-olefin (MTO) reactions, ethylene-to-propylene (ETP) reactions, as well as of the co-reaction of methanol and ethylene (CME). The processes involve contacting the compounds with the compositions or catalytic articles according to embodiments of the invention.

Ion Exchange of Metal

The first molecular sieve material promoted with iron and the second molecular sieve material promoted with copper may also be promoted with other metals. Suitable metals include, but are not limited to copper, iron, cobalt, nickel, cerium, manganese, zinc, titanium, zirconium, and combinations thereof. The metal can be exchanged after manufacture of the zeolite. According to one or more embodiments, at least a portion of the metal can be included in the tailored colloid such that the tailored colloid contains the structure directing agent, a silica source, and alumina source and a metal ion (e.g., copper) source.

For additional promotion of SCR of oxides of nitrogen, a suitable alkaline earth or alkali metal is exchanged into the iron or copper promoted molecular sieve materials. Suitable alkaline earth or alkali metals include, but are not limited to, barium, magnesium, calcium, strontium, and combinations thereof. In specific embodiments, the alkaline earth or alkali metal component is selected from barium, magnesium, calcium and combinations thereof. The metal can be exchanged after the manufacture of the molecular sieve materials.

Method of Reducing $NO_x$:

In general, the iron-promoted first molecular sieve material and the copper-promoted second molecular sieve material that are described above can be used as molecular sieves, adsorbents, catalysts, catalyst supports, or binders, thereof. In one or more embodiments, the iron-promoted first molecular sieve material and the copper-promoted second molecular sieve material are used in combination as a catalytic article in a catalyst system.

The catalyst system or catalytic article of the present invention can be used in a catalytic process involving the conversion of at least one compound comprising at least one nitrogen-oxygen bond. Embodiments of the present invention also relate to a method for selectively reducing nitrogen oxides $NO_x$ by contacting a stream containing $NO_x$ with a catalyst system or catalytic article according to the present invention under suitable reducing conditions; to a method of oxidizing $NH_3$, in particular of oxidizing $NH_3$ slip in diesel systems, by contacting a stream containing $NH_3$ with the catalyst system under suitable oxidizing conditions; to a method of decomposing of $N_2O$ by contacting a stream containing $N_2O$ with a catalyst system or catalytic article under suitable decomposition conditions; to a method of controlling emissions in Advanced Emission Systems such as Homogeneous Charge Compression Ignition (HCCI) engines by contacting an emission stream with a catalyst system or catalytic article under suitable conditions; to a fluid catalytic cracking FCC process wherein the composition is employed as additive; to a method of converting an organic compound by contacting said compound with the catalyst system or catalytic article under suitable conversion conditions; to a "stationary source" process wherein the catalyst system or catalytic article is employed.

Embodiments of the present invention also relate to a method for selectively reducing nitrogen oxides $NO_x$, wherein a gaseous stream containing high levels (exceeding 4 g/bhph) of nitrogen oxides $NO_x$, specifically also containing ammonia and/or urea, is contacted with the catalyst system or catalytic article according to one or more embodiments, for example, in the form of a molded catalytic article, specifically as a molded catalytic article wherein the washcoat is deposited on a suitable refractory carrier, still more specifically on a "honeycomb" carrier or a wall-flow filter.

The nitrogen oxides which are reduced using the catalyst system or catalytic article according to embodiments of the present invention may be obtained by any process, e.g. as a waste gas stream. Among others, waste gas streams as obtained in processes for producing adipic acid, nitric acid, hydroxylamine derivatives, caprolactame, glyoxal, methylglyoxal, glyoxylic acid or in processes for burning nitrogenous materials may be mentioned.

While ammonia is the reducing agent of choice for stationary power plants, urea is the reducing agent of choice for mobile SCR systems. Typically, the SCR system is integrated in the exhaust gas treatment system of a vehicle and, also typically, contains the following main components: selective catalytic reduction catalytic article comprising an upstream first molecular sieve promoted with iron and a downstream second molecular sieve promoted with copper, the first and second molecular sieves having a d6r unit according to embodiments of the invention; a urea storage tank; a urea pump; a urea dosing system; a urea injector/nozzle; and a respective control unit.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may contain entrained non-gaseous components such as liquid droplets, solid particulates, and the like. The exhaust gas stream of a lean burn engine typically further comprises combustion products, products of incomplete combustion, oxides of nitrogen, combustible and/or carbonaceous particulate matter (soot), and un-reacted oxygen and nitrogen.

More specific embodiments pertain to the use of a catalyst system for removal of nitrogen oxides $NO_x$ from exhaust gases of internal combustion engines, in particular diesel engines, which operate at combustion conditions with air in excess of that required for stoichiometric combustion, i.e. in a lean conditions.

Method of Treating Engine Exhaust:

Another aspect of the present invention is directed to a method of treating the exhaust gas stream of an engine. In one or more embodiments, a method for treatment of an engine exhaust gas stream, comprises treating an engine exhaust gas stream containing $NO_x$ (e.g., $NO_x$ levels exceeding 4 g/bhph over a heavy duty transient cycle) with a catalyst system including a selective catalytic reduction article including two zones including (1) an upstream SCR zone that does not contain a copper zeolite, the upstream zone operative to minimize formation of $N_2O$; and (2) a downstream active SCR zone comprising copper and a molecular sieve having a double six ring unit. The catalyst system may also be effective to reduce high $NO_x$ levels exceeding 4 g/bhph in the exhaust gas stream. In one or more specific embodiments, the first molecular sieve material and the second molecular sieve material have the CHA framework type.

In one or more embodiments, the method of treating the engine exhaust gas stream further comprises flowing the exhaust gas stream through an upstream diesel oxidation catalyst (DOC) and/or catalyzed soot filter (CSF) to produce an outflow $NO_2/NO_x$ ratio of about 0.1 to about 0.85, including about 0.3 to about 0.65, prior to reaching the upstream SCR zone. In one or more embodiments, when the exhaust gas stream, containing $NO_x$, is passed through the upstream (catalyzed) soot filter, an outflow is produced having a $NO_2/NO_x$ ratio of about 0.1 to about 0.85, including about 0.3 to about 0.65, including a ratio of about 0.1, about 0.15, about 0.2, about 0.25, about 0.3, about 0.35, about 0.4, about 0.45, about 0.5, about 0.55, about 0.6, and about 0.65, prior to the exhaust gas stream reaching the upstream SCR zone comprising the iron-promoted first molecular sieve material. Without intending to be bound by theory, it is thought that for the system with the iron-promoted first molecular sieve up-stream of the copper-promoted second molecular sieve, inlet exhaust with $NO_2/NO_x$ in the 0.4-0.5 range is needed, which is near to that for the "fast SCR reaction". The iron-promoted first molecular sieve activity drops off (~63%) with lower $NO_2/NO_x$ in the exhaust, e.g. about 0.3. The copper-promoted second molecular sieve can still operate well at about 0.3.

In some embodiments, the method for treatment of an engine exhaust gas stream containing $NO_x$ with the catalytic article described in the embodiments of the invention reduces the $NO_x$ emission level by at least 5-fold, preferably 10-fold, more preferably 15-fold compared to the $NO_x$ emission level measured in the exhaust gas stream prior to contact with the catalytic article of the invention. For example, in some embodiments, the amount of $NO_x$ emission levels are reduced to at least about 1.5 g/bhph, or at least about 1.0 g/bhph, or at least about 0.5 g/bhph, or at least about 0.25 g/bhph, or at least about 0.1 g/bhph, or at least about 0.05 g/bhph. In some embodiments, $NO_x$ emission levels decrease because of the $NO_x$ conversion activity of the catalytic article described. The catalytic article reduces $NO_x$ in the presence of a reducing agent, which is in molar excess compared to the molar amount of $NO_x$ present in the exhaust gas stream (i.e., the ratio is at least about 1.05:1 reducing agent: $NO_x$). The catalytic articles exhibits $NO_x$ conversion of at least about 80%, or at least about 90%, or at least about 95%, or at least about 96%, or at least about 97%, or at least about 98%, or at least about 99%, or at least about 99.5%.

In some embodiments, the method for treatment of an engine exhaust gas stream containing $NO_x$ with the catalytic article described in the embodiments of the invention produces at least about 50%, more preferably 65%, even more preferably 75% less $N_2O$ emission compared to a catalytic article, wherein the first zone does not comprise iron ion-exchanged onto a first molecular sieve material. For example, in some embodiments, the amount of $N_2O$ make is less than about 0.25 b/bhph, preferably less than about 0.1 b/bhph, more preferably less than about 0.05 b/bhph for a catalytic article in the presented embodiments.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1—Preparation of Cu-CHA

A Cu-CHA powder catalyst was prepared by crystallization of a CHA framework type zeolite using TMAOH (Trimethylammonium hydroxide) and TMAA (Trimethyl-1-adamantylammonium hydroxide) containing synthesis gel, separation of the CHA framework type product, drying and calcination to remove organic template (TMAOH and TMAA). Colloidal silica and Aluminum triisopropoxide were used. After the addition of the two templates TMAOH and TMAA, the synthesis gel was transferred to an autoclave for hydrothermal crystallization. After hydrothermal crystallization, the suspension was admixed with water and was filtered. The wet product was then dried and further calcined. The calcined product was then ready to be ion-exchanged with Cu to obtain the metal-containing catalyst.

An ion-exchange reaction between the Na-form CHA and the copper ions was carried out according to various techniques known in the art, for example U.S. Pat. No. 4,544,538 (Zones) and U.S. Pat. No. 6,709,644 (Zones), which are thereby incorporated in their entirety.

Example 2—Preparation of Fe-CHA

A Fe-CHA powder catalyst was prepared by ion-exchanging the Na-form CHA. A slurry was prepared of Fe-CHA with a binder according to various techniques known in the art, for example U.S. Pat. No. 4,544,538 (Zones) and U.S. Pat. No. 6,709,644 (Zones).

Example 3—Preparation of Catalytic Article Cu-CHA/Fe-CHA

Example 3A

The obtained Cu-CHA catalyst (Example 1) comprised CuO in an amount of about 3.25% by weight, as determined by ICP analysis. A Cu-CHA slurry was prepared to 30-45% solids. The slurry was milled and a binder of zirconium acetate in dilute acetic acid (containing 30% $ZrO_2$) was added into the slurry with agitation.

The slurry was coated onto 10.5"D×6"L (600/3) cellular ceramic cores, having a cell density of 400 cpsi (cells per square inch) and a wall thickness of 6.5 mil. The coated cores were dried at 110° C. for 3 hours and calcined at 450° C. for 1 hour. The coating process was repeated to obtain desired washcoat loading.

Example 3B

The obtained Fe-CHA catalyst (Example 2) comprised $Fe_2O_3$ in an amount of about 2.3% by weight, as determined by ICP analysis. A Fe-CHA slurry was prepared to 30-45% solids. The slurry was milled and a binder of zirconium acetate in dilute acetic acid (containing 30% $ZrO_2$) was added into the slurry with agitation.

The slurry was coated onto 10.5"D×6"L (600/3.5) cellular ceramic cores, having a cell density of 400 cpsi (cells per square inch) and a wall thickness of 6.5 mil. The coated cores were dried at 110° C. for 3 hours and calcined at about 400° C. for 1 hour. The coating process was repeated once to obtain a target washcoat loading of about 2.75 g/in³.

The Example 3B brick was place upstream of the Example 3A brick to provide the catalyst system of Example 3.

Example 4—Preparation of Catalytic Article Zoned Fe-CHA/Cu-CHA

The obtained Cu-CHA catalyst (Example 1) comprised CuO in an amount of about 3.25% by weight, as determined by ICP analysis. A Cu-CHA slurry was prepared to 30-45% solids. The slurry was milled and a binder of zirconium acetate in dilute acetic acid (containing 30% $ZrO_2$) was added into the slurry with agitation. The obtained Fe-CHA catalyst (Example 2) comprised $Fe_2O_3$ in an amount of about 2.3% by weight, as determined by ICP analysis. A Fe-CHA slurry was prepared to 30-45% solids. The slurry was milled and a binder of zirconium acetate in dilute acetic acid (containing 30% $ZrO_2$) was added into the slurry with agitation.

The Fe-CHA slurry was coated upstream of the Cu-CHA slurry onto 10.5"D×6"L (600/3) cellular ceramic cores, having a cell density of 400 cpsi (cells per square inch) and a wall thickness of 6.5 mil. The coated cores were dried at 110° C. for 3 hours and calcined at about 400° C. for 1 hour. The coating process was repeated to obtain desired washcoat loading.

Example 5—Comparative Catalytic Article Cu-CHA/Cu-CHA

Example 5A

The obtained Cu-CHA catalyst (Example 1) comprised CuO in an amount of about 3.25% by weight, as determined by ICP analysis. A Cu-CHA slurry was prepared to 30-45% solids. The slurry was milled and a binder of zirconium acetate in dilute acetic acid (containing 30% $ZrO_2$) was added into the slurry with agitation.

The slurry was coated onto 10.5"D×6"L (600/3) cellular ceramic cores, having a cell density of 400 cpsi (cells per square inch) and a wall thickness of 6.5 mil. The coated cores were dried at 110° C. for 3 hours and calcined at about 400° C. for 1 hour. The coating process was repeated to obtain desired washcoat loading.

Example 5B

The obtained Cu-CHA catalyst (Example 1) comprised CuO in an amount of about 3.25% by weight, as determined by ICP analysis. A Cu-CHA slurry was prepared to 30-45% solids. The slurry was milled and a binder of zirconium acetate in dilute acetic acid (containing 30% $ZrO_2$) was added into the slurry with agitation.

The slurry was coated onto 10.5"D×6"L (600/3) cellular ceramic cores, having a cell density of 400 cpsi (cells per square inch) and a wall thickness of 6.5 mil. The coated cores were dried at 110° C. for 3 hours and calcined at about 400° C. for 1 hour. The coating process was repeated to obtain desired washcoat loading.

The Example 5A brick was placed upstream of the Example 5B brick to provide the catalyst system of Example 5.

Example 6—Comparative Catalytic Article Zoned Cu-CHA/Cu-CHA

The obtained Cu-CHA catalyst (Example 1) comprised CuO in an amount of about 3.25% by weight, as determined by ICP analysis. A Cu-CHA slurry was prepared to 30-45% solids. The slurry was milled and a binder of zirconium acetate in dilute acetic acid (containing 30% $ZrO_2$) was added into the slurry with agitation.

The Cu-CHA slurry was coated upstream of the Cu-CHA slurry onto 10.5"D×6"L (600/3) cellular ceramic cores, having a cell density of 400 cpsi (cells per square inch) and a wall thickness of 6.5 mil. The coated cores were dried at 110° C. for 3 hours and calcined at about 400° C. for 1 hour. The coating process was repeated to obtain desired washcoat loading.

Example 7—Engine Testing

Figure 8:
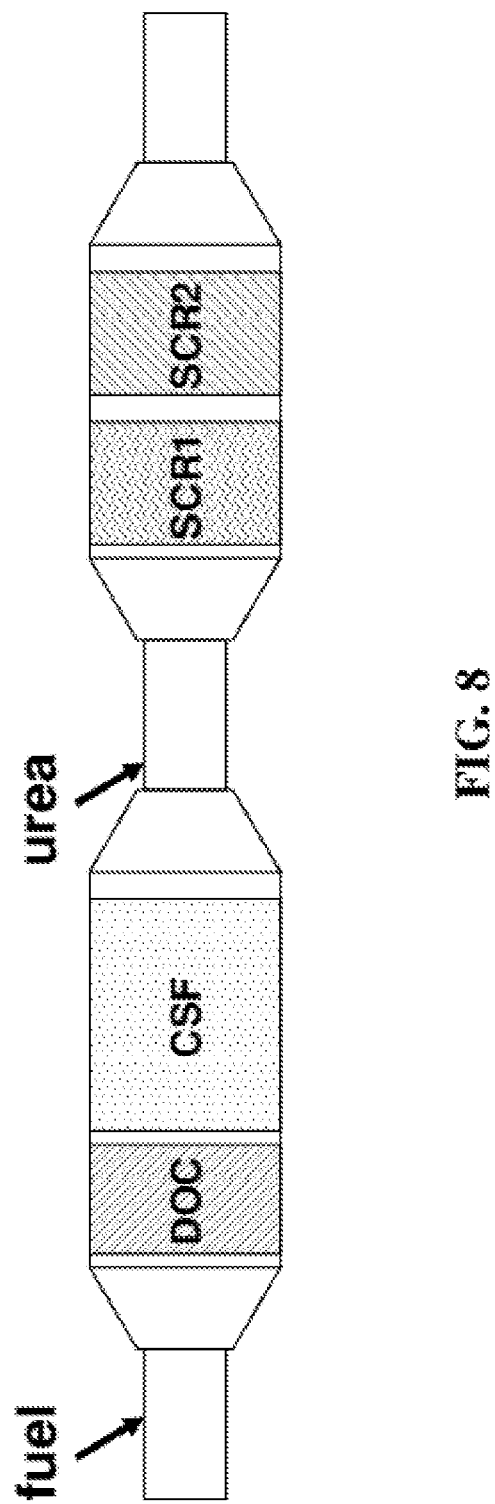
FIG. 8 is a diagram of the aftertreatment system configuration used for engine testing and comparison of a control and one example of the invention.

Engine testing was conducted to demonstrate the effectiveness of one of the aftertreatment system configurations described above. This consisted of a Diesel Oxidation Catalyst (DOC) and Catalytic Soot Filter (CSF) up-stream of two flow-thru Selective Catalytic Reduction units (SCRs) in series (FIG. 8): DOC: 34 g/ft³ platinum group metal, Pt/Pd ratio=1.3/1.0, 10.5"×4"/400/4; CSF: 5 g/ft³ platinum group metal, Pt/Pd ratio=10:1, 10.5"×12"/200/12. The downstream SCR catalysts were coated onto substrates having 600 cpsi cell spacing and were each of 10.5"×6" size (8.5 liter volume). For the engine testing two SCR catalyst configurations were evaluated using the catalytic articles prepared in Examples 1-6. One configuration was a control that had Cu-chabazite at the first (SCR1) position and Cu-chabazite also at the second (SCR2) position. The other test configuration was an example of this invention and consisted of Fe-chabazite in the SCR1 position and Cu-chabazite in the SCR2 position. For both test configurations the Cu-chabazite in the SCR2 position was kept the same and only the catalyst at the SCR1 position was changed. Prior to testing each of the SCR catalysts had undergone aging in a system under continuous "active regeneration" for 100 hrs with 650° C. at SCR-in with moderate urea injection (NSR=0.7).

Testing of the control and invention configurations was conducted on a 300 HP 6.8 liter 6 cylinder engine under transient conditions using a protocol consisting of 8 consecutive FTP (HDDT) cycles (no soaks). This engine used a calibration that gave relatively high cycle cumulative $NO_x$ emissions (5.6-5.7 g/bhph) in this test. Prior to running a test protocol the system was cleaned under active regeneration for 15 min. at 600° C. (CSF-in). For each system the test protocol was run three (3) times with variation in the urea injection level. The urea injection levels were NSR=1.0, 1.1 and 1.2 using a simple $NO_x$-following strategy. The term NSR stands for "Normalized Stoichiometric Ratio", also sometime referred to as ANR (Ammonia $NO_x$ Ratio), and is the molar ratio of ammonia (from injected urea) to $NO_x$ (as $NO_2$) for the SCR reaction. An NSR=1.0 would satisfy the reaction under ideal conditions and NSR=1.1 and 1.2 represent overdosing above the ideal by 10% and 20%, respectively.

Figure 9:
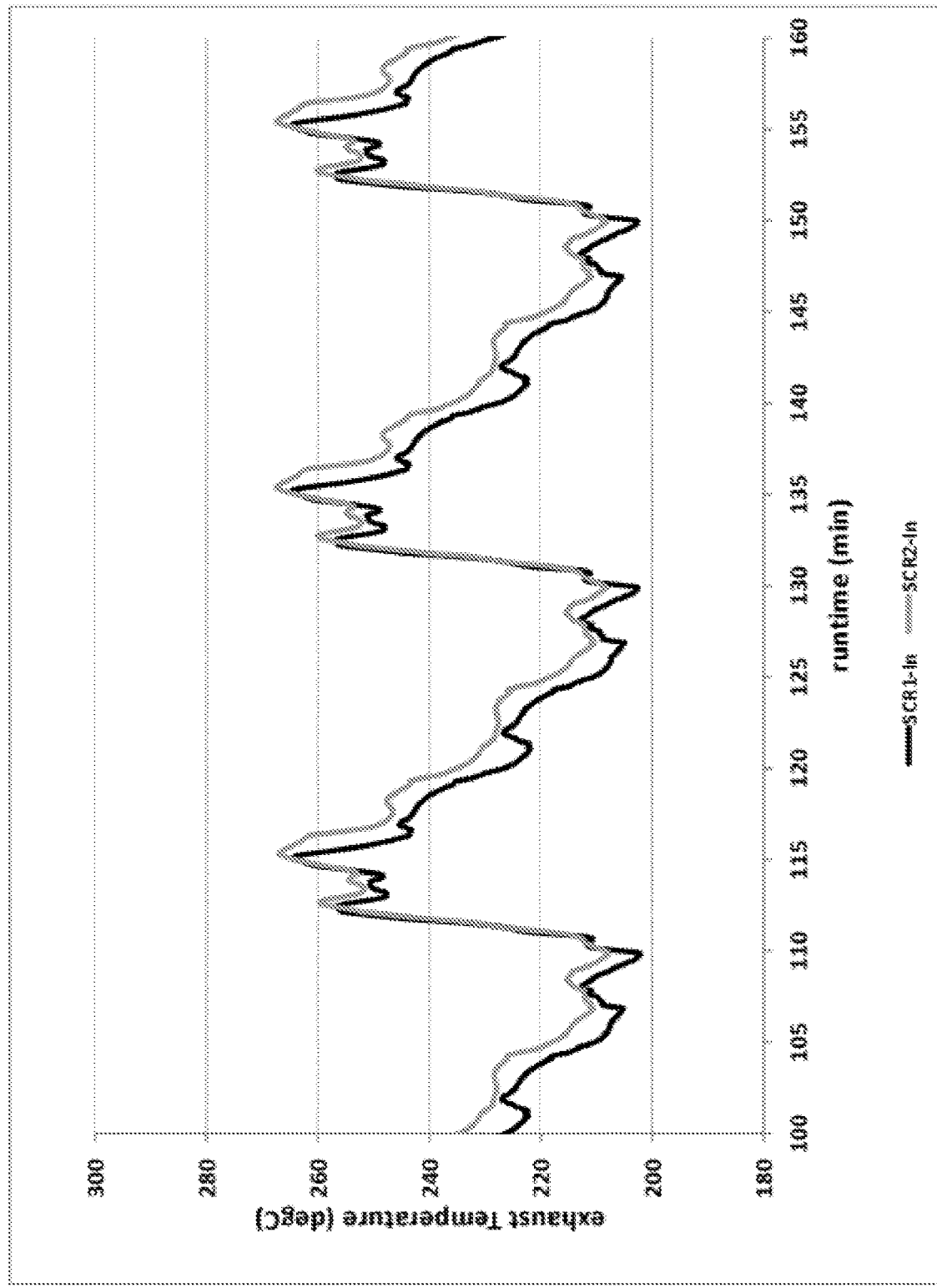
FIG. 9 is a plot of the exhaust temperatures at SCR1-in and SCR2-in over FTP transient tests for the engine evaluations.

An example of the exhaust temperatures at SCR1-in and SCR2-in over the FTP transients of the engine test protocol is shown in FIG. 9 and it can be seen that the temperatures ranged from ~204-266° C. which is on the lower range for the SCR reaction. Typically, urea solution is not injected below 200° C. due to issues with slow water evaporation and decomposition of the urea to liberate $NH_3$; however, for the test protocol it was possible to inject urea over the whole cycle.

Figure 10:
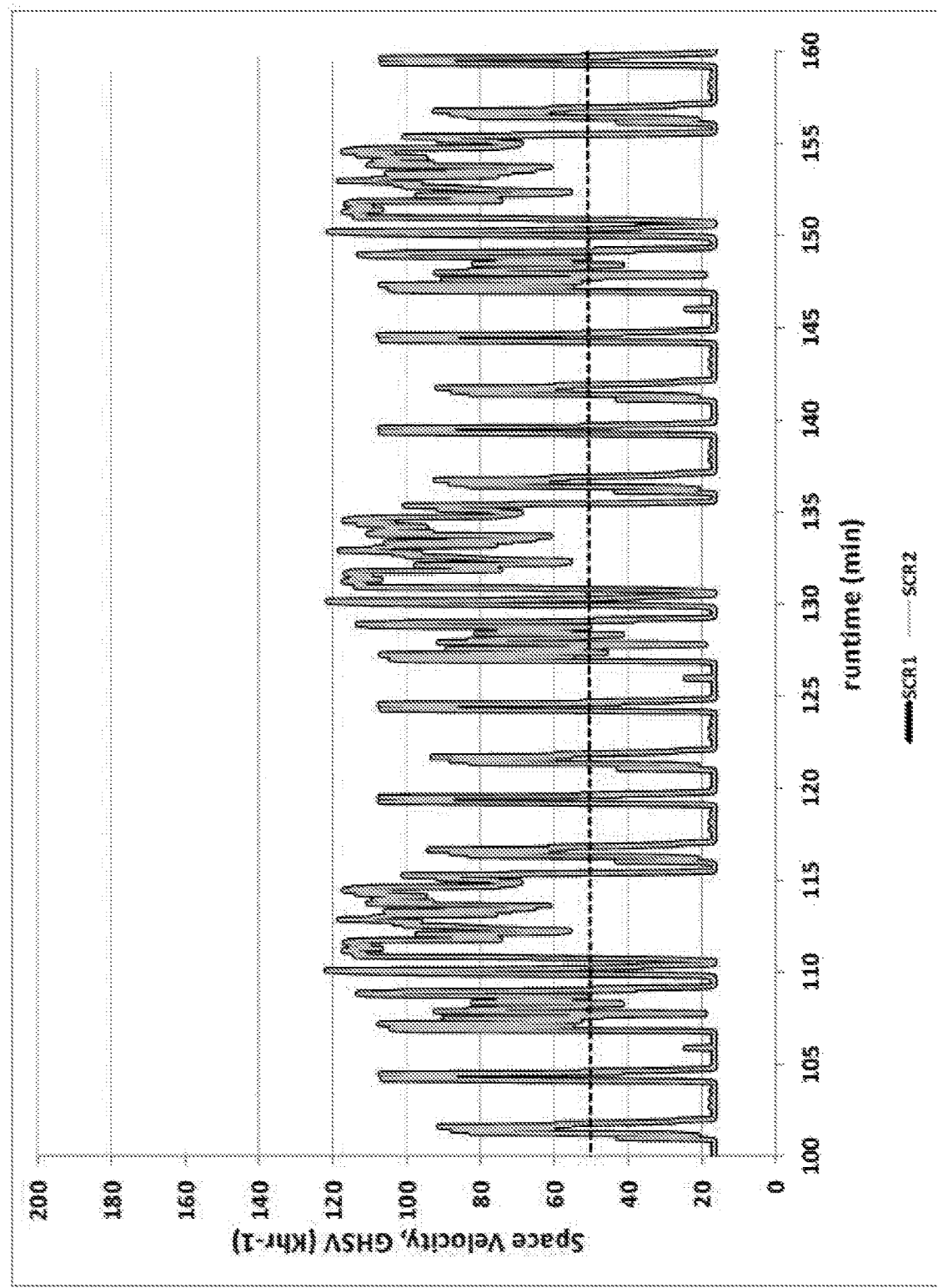
FIG. 10 is a plot of the gas hourly space velocity for SCR1 and for SCR2 over the FTP transient tests for the engine evaluations.

An example of the gas hourly space velocity (GHSV) levels for SCR1 and SCR2 over the FTP transients of the engine test protocol is shown in FIG. 10. It can be seen that for each of the 10.5"×6" (8.5 liter) SCR catalysts the GHSV ranged from ~17 $Kh^{-1}$ at idle to a peak of ~121 $Khr^{-1}$ and a trend line drawn thru the range gave an average of ~48 $Khr^{-1}$. For the system the GHSV levels for the total SCR volume (SCR1+SCR2) would be half of the stated levels.

Figure 11:
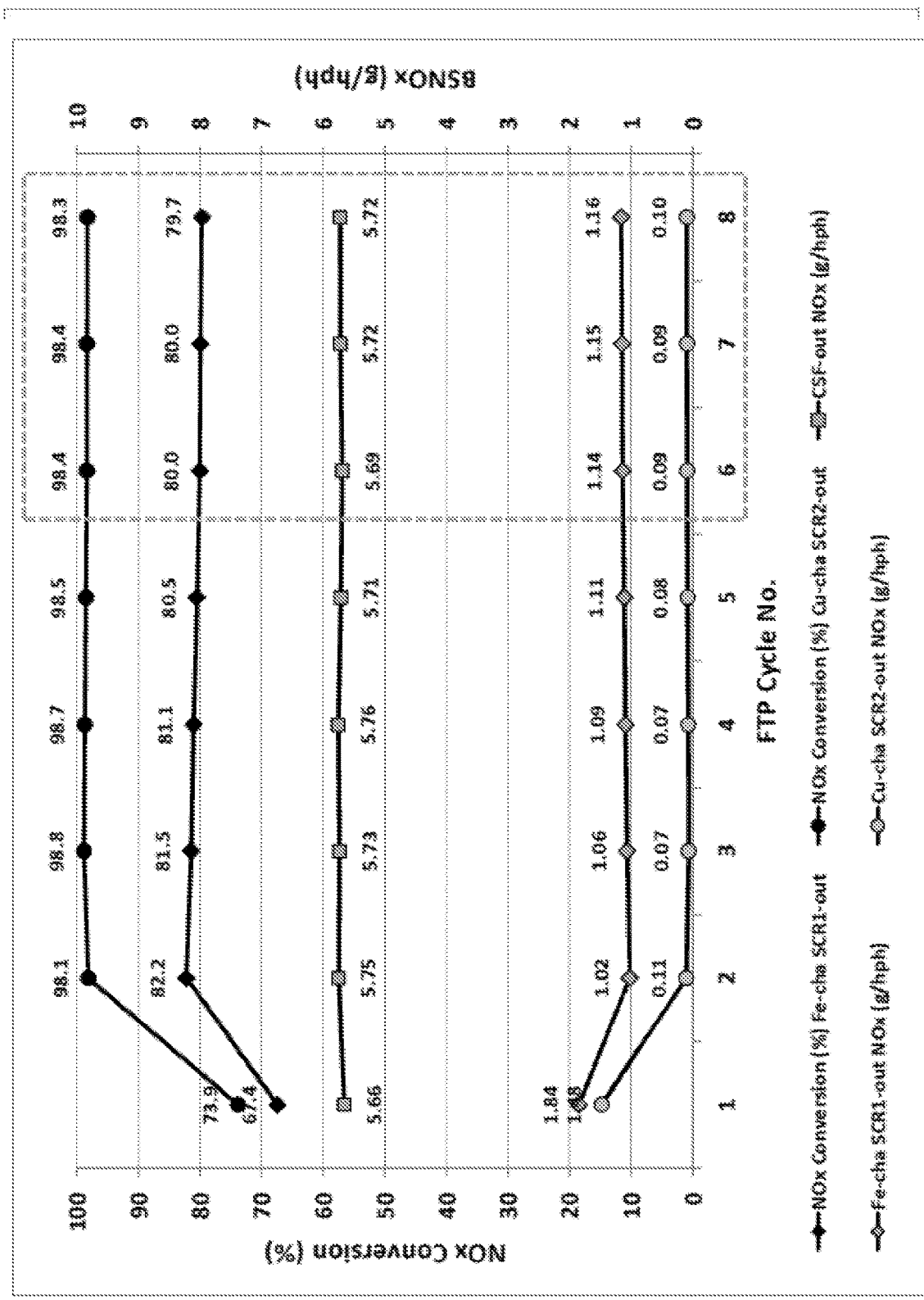
FIG. 11 is an example of cycle-by-cycle data ($NO_x$ conversion, %, and $NO_x$ emissions levels, g/bhph) over the 8 FTP cycle test protocol.

An example of the calculated $NO_x$ conversion (%) levels at SCR1-out and SCR2-out along with the $NO_x$ emissions levels (g/bhph) at CSF-out (baseline) and SCR1-out and SCR2-out is shown in FIG. 11 for the 8 FTP cycle protocol. This is for the test of the example invention configuration with NSR=1.2 urea injection. It can be seen that for FTP cycle #1 the $NO_x$ conversion at SCR1-out and SCR2-out was relatively low (67% & 74%, respectively) and the corresponding $NO_x$ emissions levels were relatively high (1.84 & 1.48 g/bhph, respectively). This is due to the fact that the system had just previously undergone an active regeneration which had removed all of the stored $NH_3$ from the chabazite SCR catalysts. However, it can also be seen that the system rapidly comes to an equilibrium for FTP cycles #2-8 and $NO_x$ conversion levels at SCR1-out and SCR2-out increase to ~80% and 98%, respectively. The corresponding $NO_x$ emissions levels were reduced to 1.0-1.2 g/bhph and 0.07-0.1 g/bhph, respectively. The latter are well below the US on-road $NO_x$ requirement, although the test protocol is not a certification test. For the testing the equilibrium data was taken as an average of the last three FTP cycles (shown).

Figure 12:
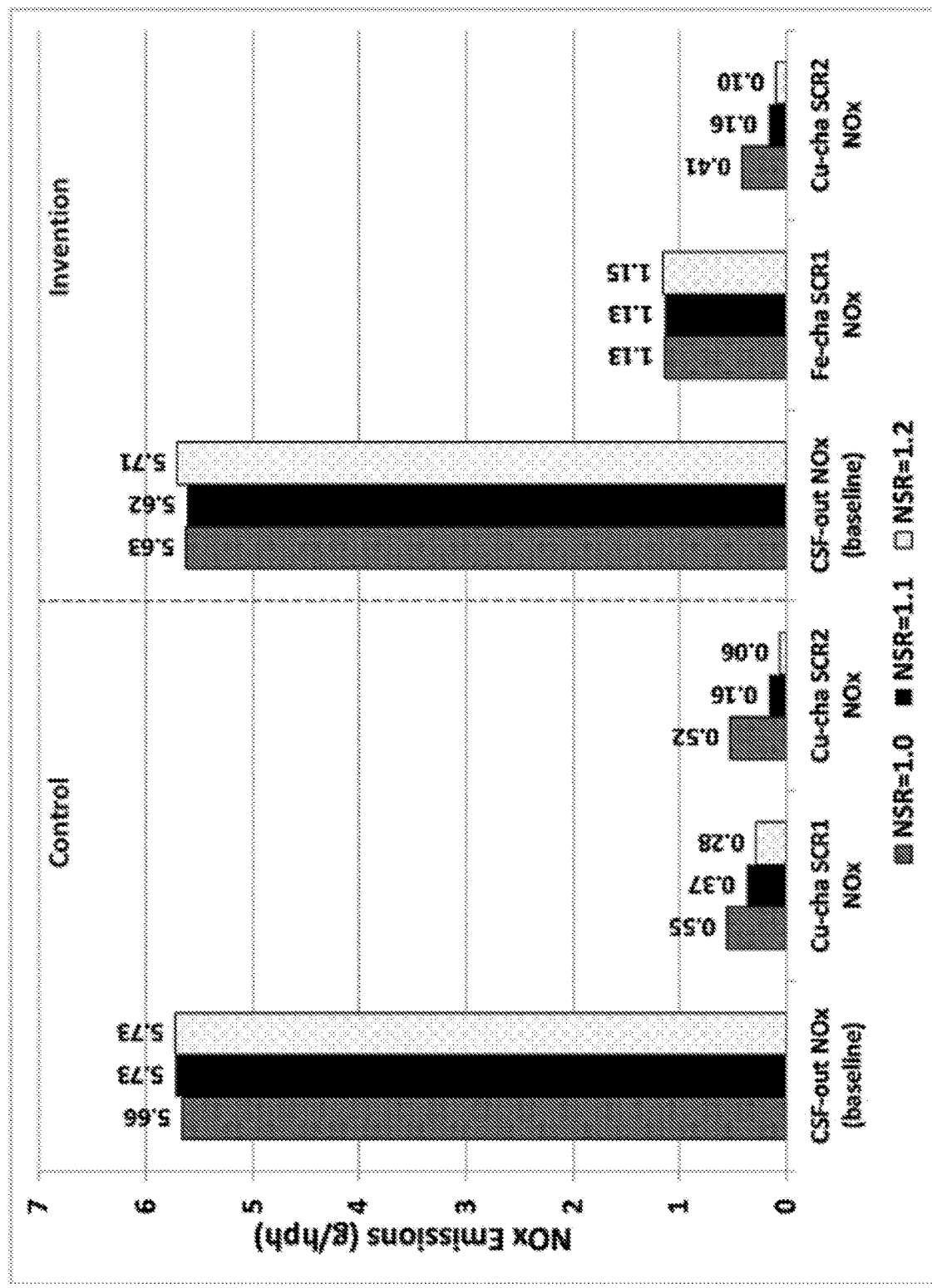
FIG. 12 is a plot of average $NO_x$ emissions levels (g/bhph) for tests of the control and invention example as a function of urea injection level (NSR)

The equilibrium, average $NO_x$ emissions levels at CSF-out, SCR1-out and SCR2-out for the control system (Cu-CHA SCR1+Cu-CHA SCR2) and an example of the invention (Fe-CHA SCR1+Cu-CHA SCR2) as a function of urea injection level (NSR) are compared in FIG. 12. It can be seen that for all the tests the average CSF-out (baseline) $NO_x$ emission level was ~5.7 g/bhph. Although not shown the CSF-out FTP cycle cumulative $NO_2/NO_x$ ratio in the exhaust for the test averaged ~0.47 ($NO:NO_2 \cong 0.94$) which was in a good range for the "fast SCR reaction". It can also be seen that the $NO_x$ emissions levels were significantly decreased at SCR1-out and SCR2-out for both systems.

For the control system $NO_x$ emissions levels at Cu-CHA SCR1-out were 0.55 g/bhph (NSR=1.0), 0.37 g/bhph (NSR=1.1) and 0.28 g/bhph (NSR=1.2) which was 90.3%, 93.5% and 95.1% $NO_x$ conversion levels, respectively. At Cu-CHA SCR2-out the $NO_x$ emissions were 0.52 g/bhph (NSR=1.0), 0.16 g/bhph (NSR=1.1) and 0.06 g/bhph (NSR=1.2), which were equivalent to $NO_x$ conversion levels of 90.8%, 97.2% and 99.0%, respectively. Clearly, $NO_x$ reduction was increased significantly at SCR2-out with urea overdosing (NSR=1.1 and 1.2). This was a result of more $NH_3$ slip from the up-stream SCR1 for reaction with residual NQ over the down-stream SCR2 catalyst.

The response with the example invention configuration was slightly different. The $NO_x$ emission levels at Fe-CHA SCR1-out were slightly lower and were the same (1.13-1.15 g/bhph) which resulted in 79.9% $NO_x$ conversion regardless of the urea injection (NSR) level. However, this resulted in $NH_3$ slip from SCR1-out to Cu-CHA SCR2-in that was utilized for further, significant NQ reduction. At Cu-CHA SCR2-out for the example invention configuration the $NO_x$ emissions were 0.41 g/bhph (NSR=1.0), 0.16 g/bhph (NSR=1.1) and 0.10 g/bhph (NSR=1.2) which were equivalent to $NO_x$ conversion levels of 92.7%, 97.2% and 98.2%, respectively. In spite of the lower $NO_x$ reduction at SCR1-out for the example invention configuration (Fe-CHA+Cu-CHA), it gave essentially the same $NO_x$ reduction at SCR2-out as a function of urea injection (NSR) level as was achieved for the control configuration (Cu-CHA+Cu-CHA).

Figure 13:
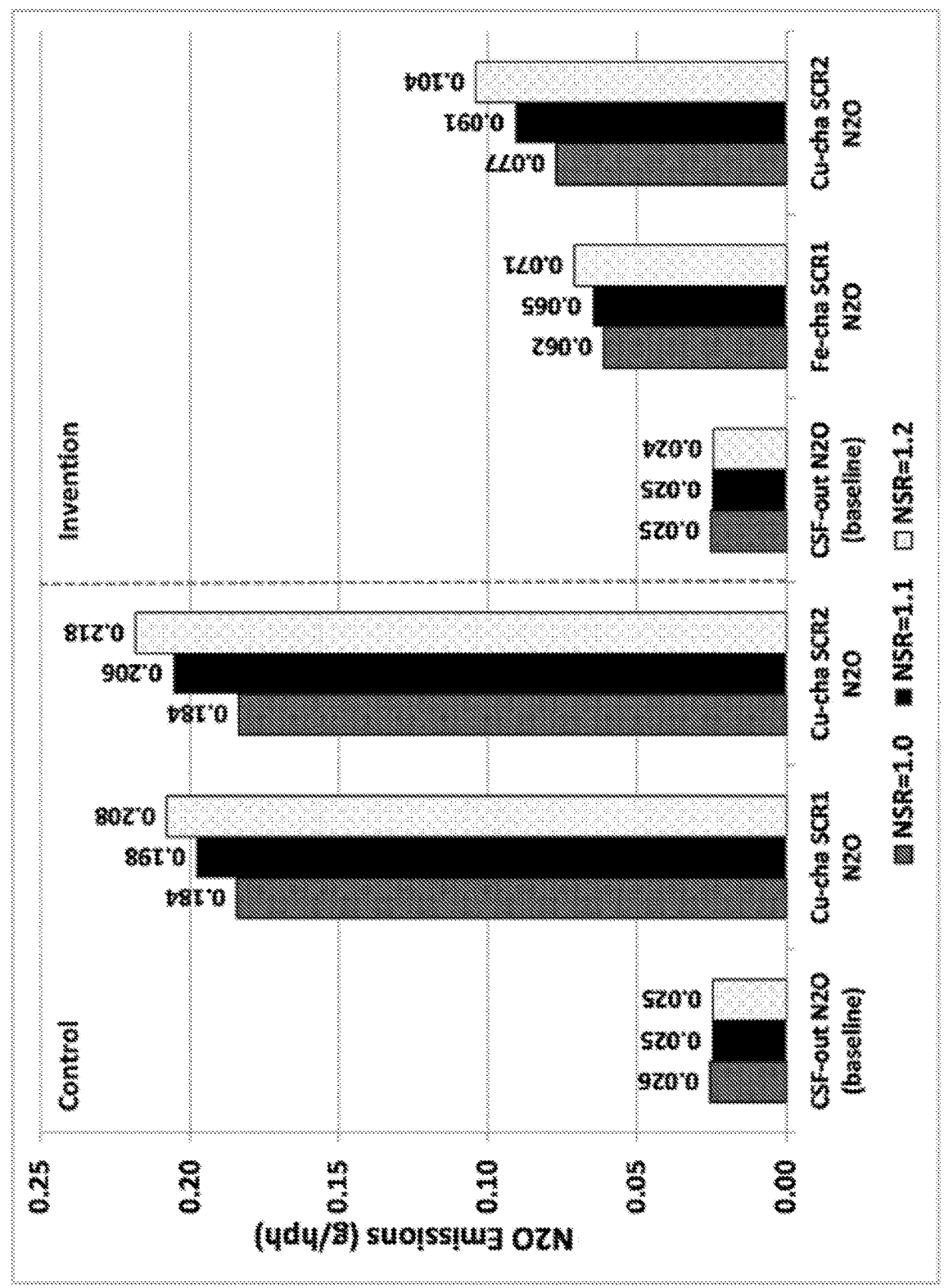
FIG. 13 is a plot of the average $N_2O$ emissions levels (g/bhph) for tests of the control and invention example as a function of urea injection level (NSR)

The corresponding $N_2O$ emissions levels for the testing of the control configuration and the example invention configuration are shown in FIG. 13.

Here it can be seen that the $N_2O$ emissions levels for the testing at CSF-out (baseline) was quite low (0.024-0.026 g/bhph).

For the control configuration it can be seen that the $N_2O$ emissions levels were significantly increased relative to CSF-out at both SCR1-out and SCR2-out. This demonstrated that a large amount of $N_2O$ was produced as a by-product of the SCR reaction over the Cu-CHA+Cu-CHA configuration. The testing also showed that there was also an increase in $N_2O$ emissions, but to a lesser degree, as a function of the urea injection (NSR) level. The $N_2O$ emissions levels at SCR1-out were 0.184 g/bhph (NSR=1.0), 0.198 g/bhph (NSR=1.1) and 0.208 g/bhph (NSR=1.2). The levels of $N_2O$ emissions increased slightly at SCR2-out due to the incremental increase in $NO_x$ conversion over SCR2 and were 0.184 g/bhph, 0.206 g/bhph and 0.218 g/bhph, respectively.

For the example invention system (Fe-CHA+Cu-CHA), it can be seen that the $N_2O$ emissions levels at SCR1-out and SCR2-out were dramatically reduced relative to the control configuration. The $N_2O$ emissions levels at Fe-CHA SCR1-out were 0.062 g/bhph (NSR=1.0), 0.065 g/bhph (NSR=1.1) and 0.071 g/bhph (NSR=1.2). These levels were 66-69% lower than the corresponding $N_2O$ emissions at Cu-CHA SCR1-out for the control configuration. The $N_2O$ emissions levels at SCR2-out for the example invention configuration were 0.077 g/bhph (NSR=1.0), 0.091 g/bhph (NSR=1.1) and 0.104 g/bhph (NSR=1.2). These levels for the example invention configuration were 52-59% lower than the corresponding $N_2O$ emissions at SCR2-out for the control configuration.

Figure 14:
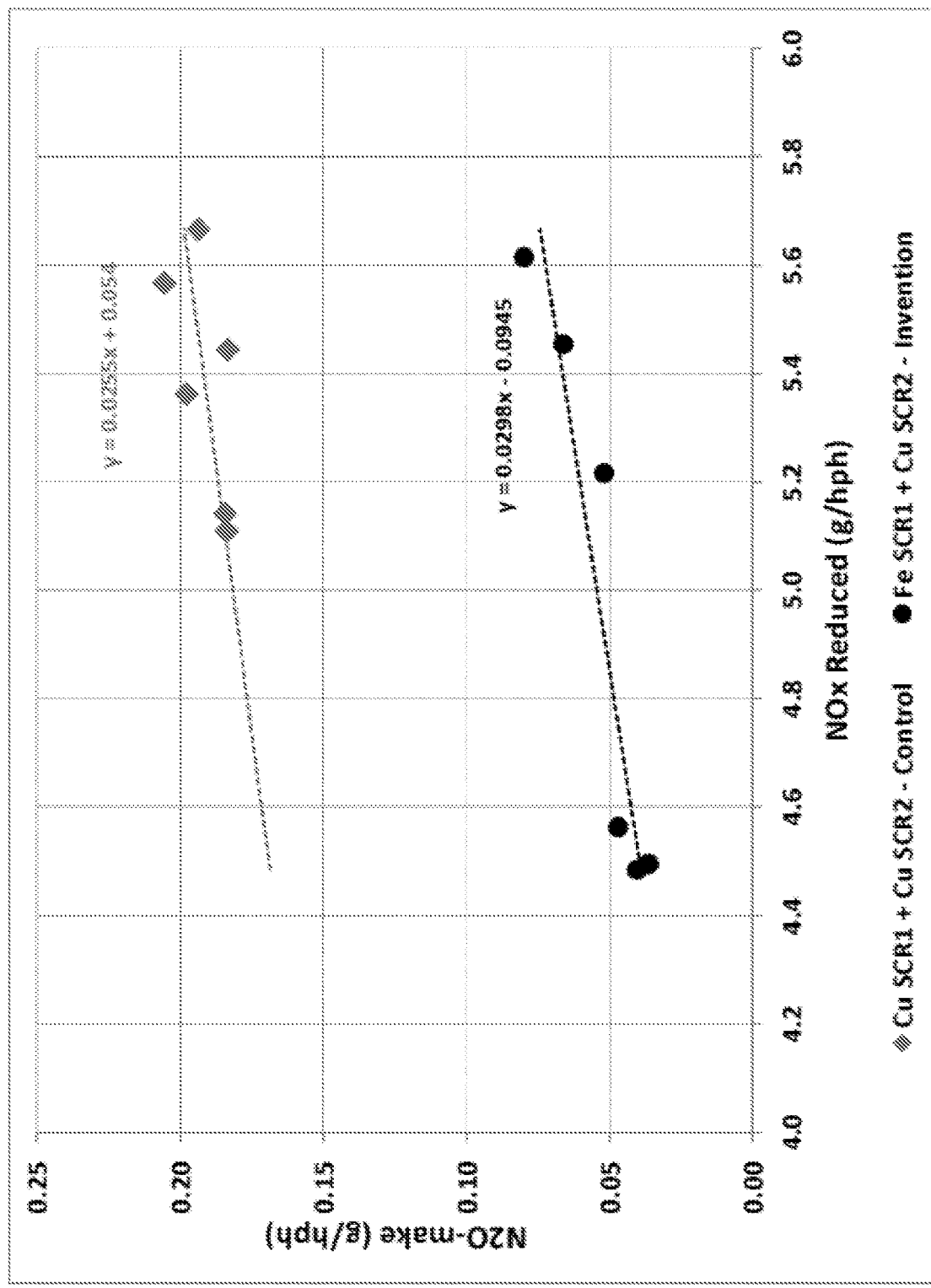
FIG. 14 is a plot of the $N_2O$-make (g/bhph) as a function of $NO_x$ reduced (g/bhph) for engine tests of the control and invention example configurations.

The data from FIG. 12 and FIG. 13 can be used to show another comparison of the performance of the example invention configuration and the control configuration. The difference (delta) in the $N_2O$ emissions; SCR1-out minus CSF-out and SCR2-out minus CSF-out can be graphed as a function of the difference (delta) in the $NO_x$ emissions levels; CSF-out minus SCR1-out and CSF-out minus SCR2-out. This can show the response of $N_2O$-make as a function of $NO_x$ reduced. This is compared for the control configuration and the example invention configuration in FIG. 14. This clearly shows that the $N_2O$-make response for the example invention configuration is much less than for the control configuration.

Figure 15:
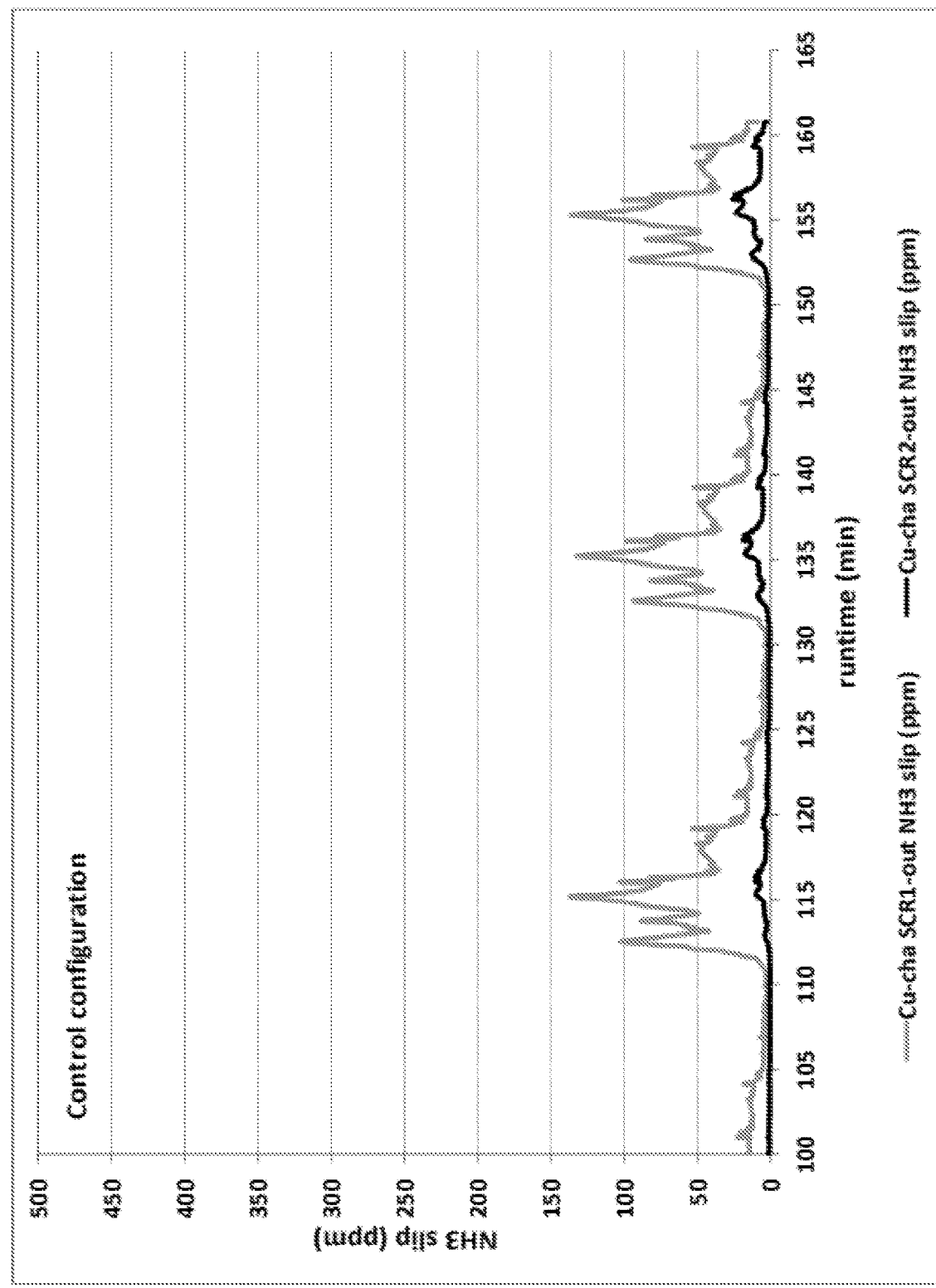
FIG. 15 is a plot of the $NH_3$ slip (ppm) at SCR1-out and SCR2-out for the control test configuration over the last 3 FTP cycles of the engine test protocol.

The $NH_3$ slip (ppm) at SCR1-out and SCR2-out for the control configuration tested with NSR=1.1 is shown in FIG. 15. Here it can be seen that at SCR1-out the peak $NH_3$ slip was ~136 ppm which was reduced to ~26 ppm at SCR2-out by further $NO_x$ conversion over SCR2. The $NH_3$ slip at SCR2-out was very low, but could be reduced further by a down-stream ammonia oxidation catalyst (AMOx), as illustrated in FIG. 1.

Figure 16:
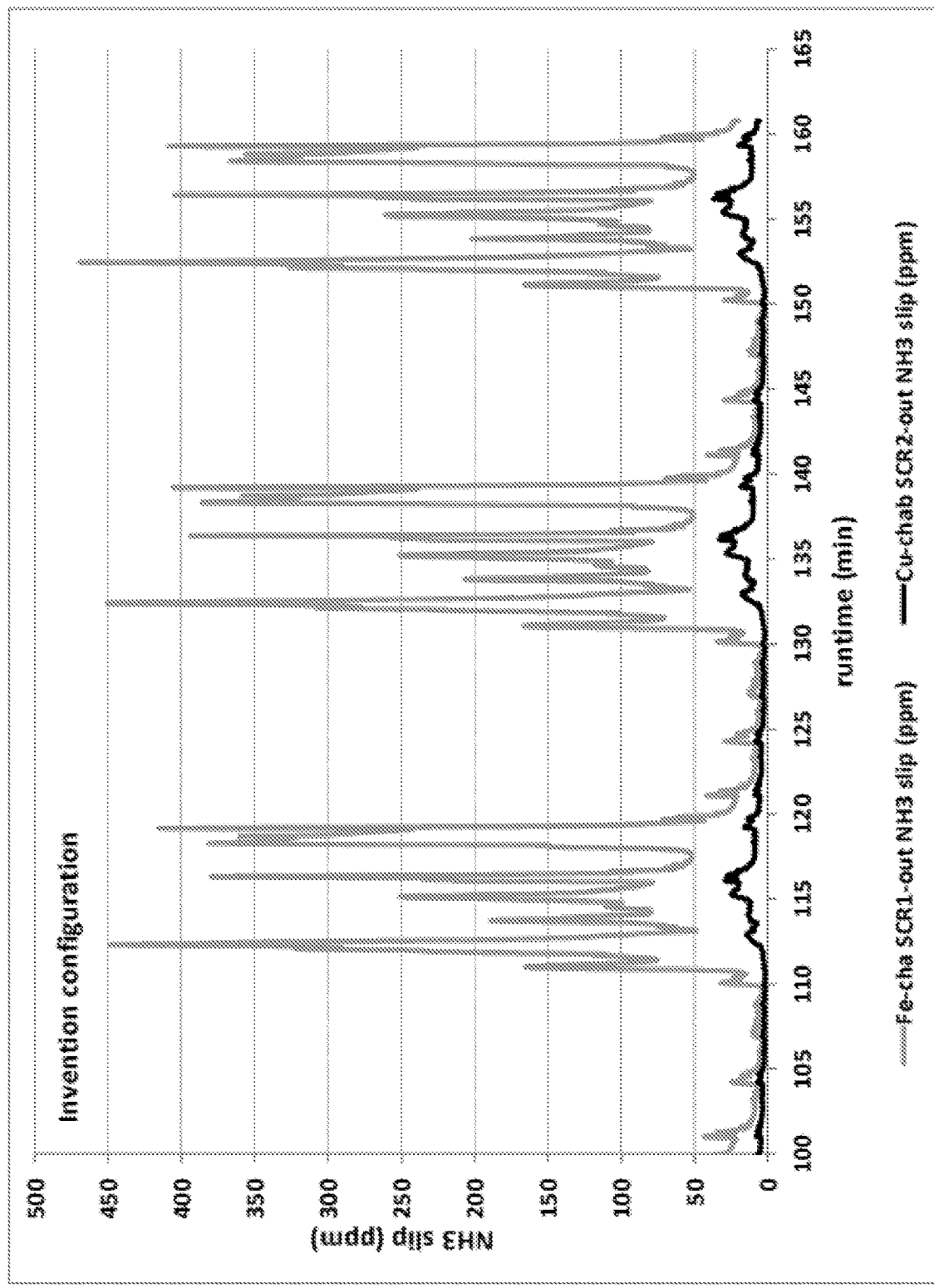
FIG. 16 is a plot of the $NH_3$ slip (ppm) at SCR1-out and SCR2-out for the example invention test configuration over the last 3 FTP cycles of the engine test protocol.

The NH$_3$ slip (ppm) at SCR1-out and SCR2-out for the example invention configuration tested with NSR=1.1 is shown in FIG. 16. Here it can be seen that at SCR1-out the peak NH$_3$ slip was much higher (~450 ppm) than for the control system. However, the SCR1-out NH$_3$ slip was used effectively over the down-stream SCR2 catalyst and was thereby reduced to ~37 ppm peak at SCR2-out. Again this low level of NH$_3$ slip at SCR2-out could be reduced further by a down-stream ammonia oxidation catalyst (AMOx), as illustrated in FIG. 1.

Here-in lies the significant development that is represented by the example invention configuration with Fe-chabazite SCR as the first catalyst component to interact with the exhaust gas NO$_x$ followed by subsequent contact with a Cu-chabazite SCR catalyst component. The example invention configuration (Fe-CHA+Cu-CHA) gave high NO$_x$ reduction at SCR2-out that was equivalent to the control configuration (Cu-CHA+Cu-CHA). However, the example invention configuration gave N$_2$O emissions levels that were 52-59% lower than with the control configuration and thereby showed significantly better control of this powerful green-house gas (GHG).

Example 8—Engine Testing Using a Heavy Duty Diesel System

Previous engine testing studies have shown that one possibility to lower N$_2$O-make while maintaining good NO$_x$ reduction was to use Fe-SSZ13 catalyst composition up-stream (i.e., SCR1) of the more active NO$_x$ conversion catalyst composition Cu-SSZ13 (i.e., SCR2) in a HDD aftertreatment system. Further HDD engine transient testing has been conducted in UEL D4 on the 6.8 L/300 HP engine to investigate the effect of the relative length of the Fe-SSZ13 catalyst composition compared to the Cu-SSZ13 catalyst composition in the system.

Figure 17:
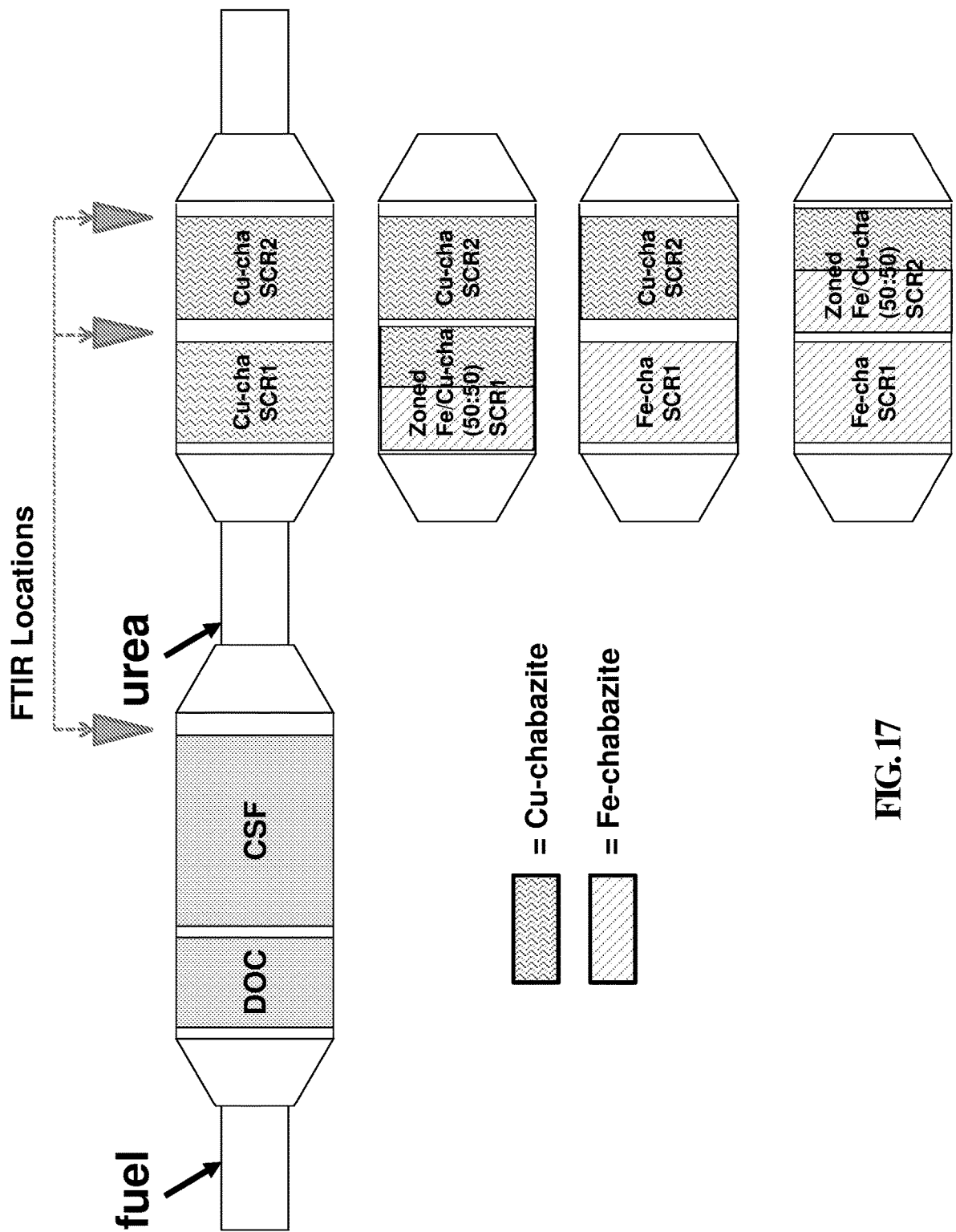
FIG. 17 is a diagram of the aftertreatment system configuration used for engine testing in a HDD (Heavy Diesel Duty) for evaluation of SCR-1 and SCR-2 with different Fe-SSZ13/Cu-SSZ13 lengths.

For this testing the system was comprised of a DOC and a CSF component, which were kept the same for all the testing. The SCR1 and SCR2 catalyst compositions were both kept at the same size 10.5"×6" (8.5 liters) with 600 cpsi. The possible test configurations are shown in FIG. 17. The first case was the reference case, which was a total Cu-SSZ13 catalyst system with a TEX-1708 (DG=3 g/in$^3$) SCR1 and a TEX-1596 (DG=2.75 g/in$^3$) SCR2. The second case had a TEX-1384 zoned SCR1 with 50:50 zone lengths of Fe-SSZ13 & Cu-SSZ13, respectively (DG=2.75 g/in$^3$), followed by the same TEX-1596 Cu-SSZ13 at the SCR2 location. The third case had a TEX-1383 Fe-SSZ13 (DG=2.75 g/in$^3$) SCR1 followed by the TEX-1596 Cu-SSZ13 at the SCR2 location. The fourth case had the TEX-1383 Fe-SSZ13 at the SCR1 location followed by the TEX-1384 zoned (50:50) Fe-SSZ13/Cu-SSZ13 at the SCR2 location.

Each of the SCR catalysts shown had been aged under continuous active regeneration 50 hrs/650deg C. SCR-in with NSR=0.7 prior to the testing.

For each catalyst system test the DOC was TEX-0681/34g (1.33:1) on 10.5"×6"/400/4 and the CSF was TEX-0499/5g (10:1) on 10.5"×12"/200/12. The CSF-out (SCR1-in) FTP cycle cumulative NO$_2$/NO$_x$ ratio with this DOC+CSF was in the 0.42-0.43 range which was good for the "fast SCR mechanism".

Figure 18:
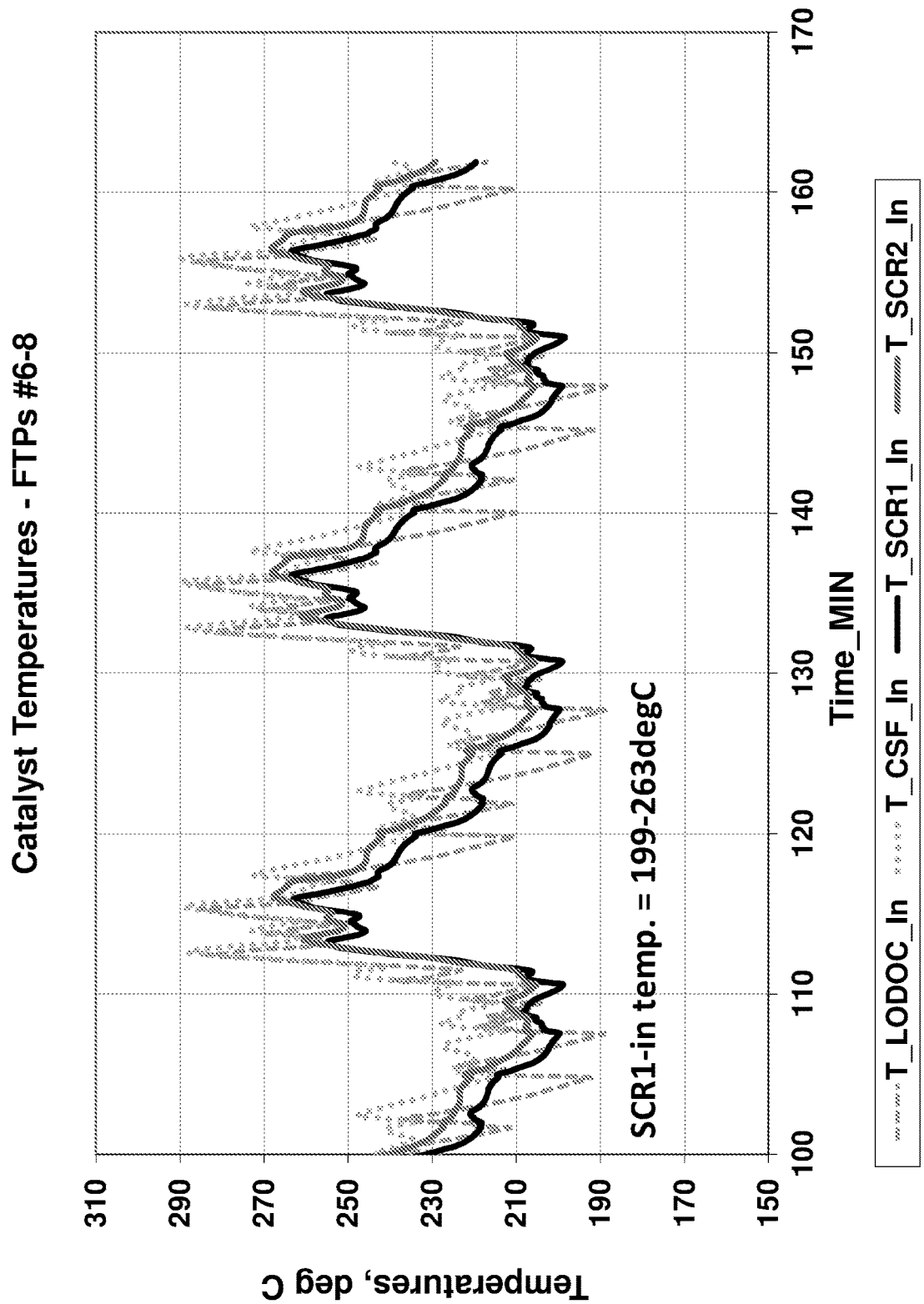
FIG. 18 is a plot of the exhaust temperatures by system component location (FTP cycles #6-8)
Figure 19:
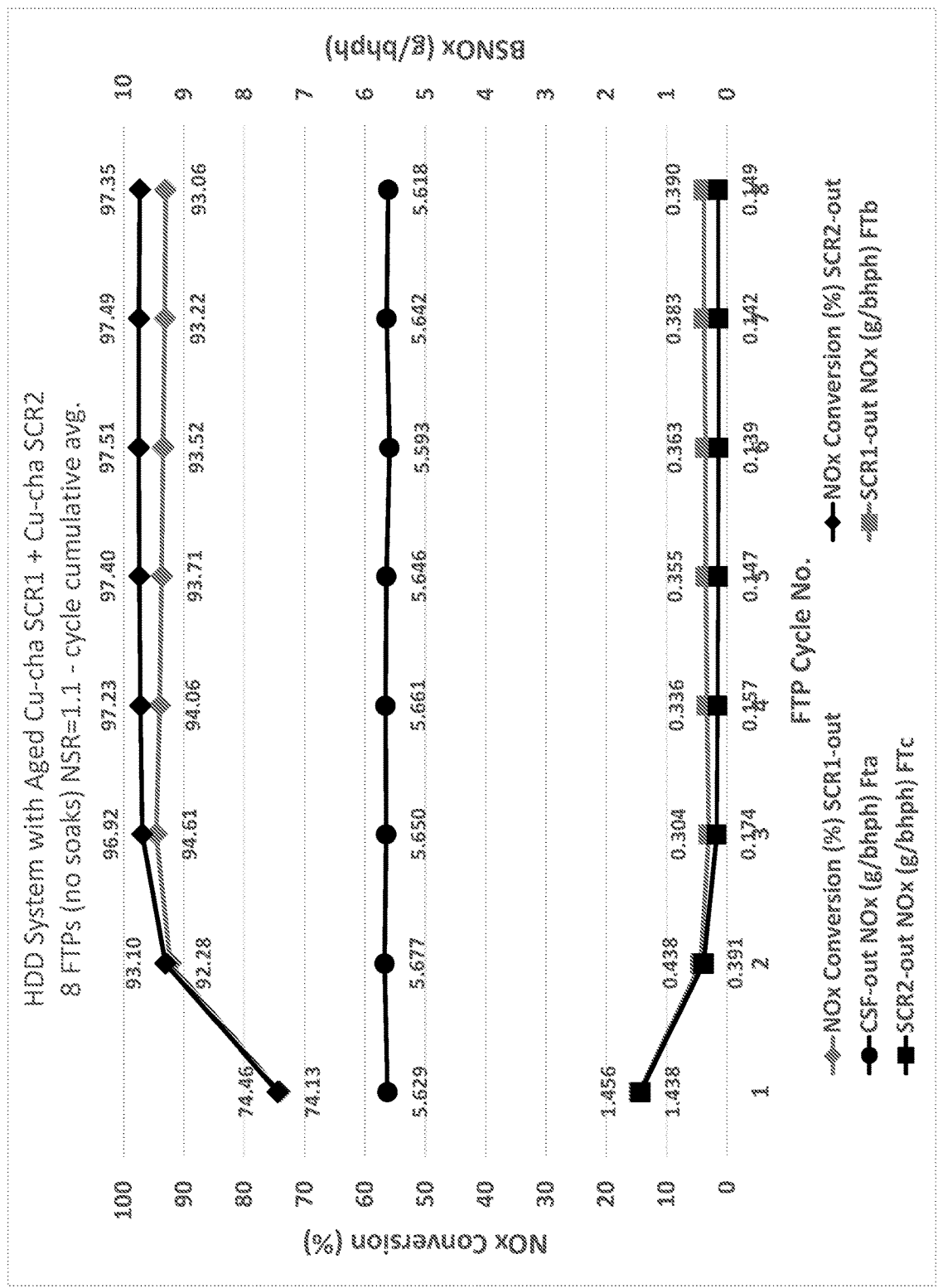
FIG. 19 is an example of cycle-by-cycle data ($NO_x$ conversion, %, and $NO_x$ emissions levels, g/bhph) over the 8 FTP cycle test protocol of an HDD system test with aged TEX-1708+TEX-1596 and an NSR=1.1.
Figure 20:
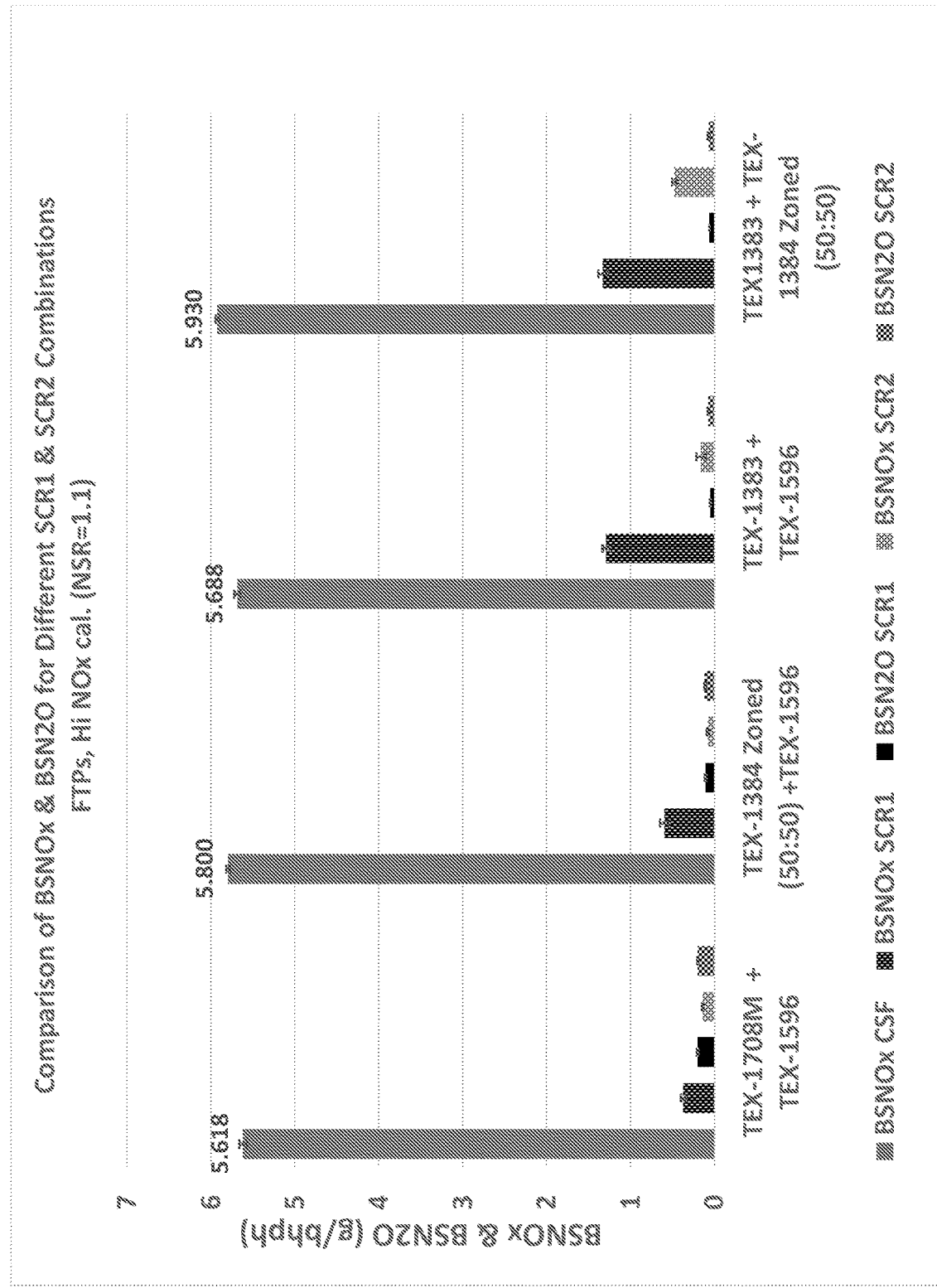
FIG. 20 is a bar graph of BSNOx and BSN$_2$O levels (g/bhph) at CSF-out, SCR1-out and SCR2-out of four different SCR1 and SCR2 combinations with different Fe-SSZ13/Cu-SSZ13 lengths.
Figure 21:
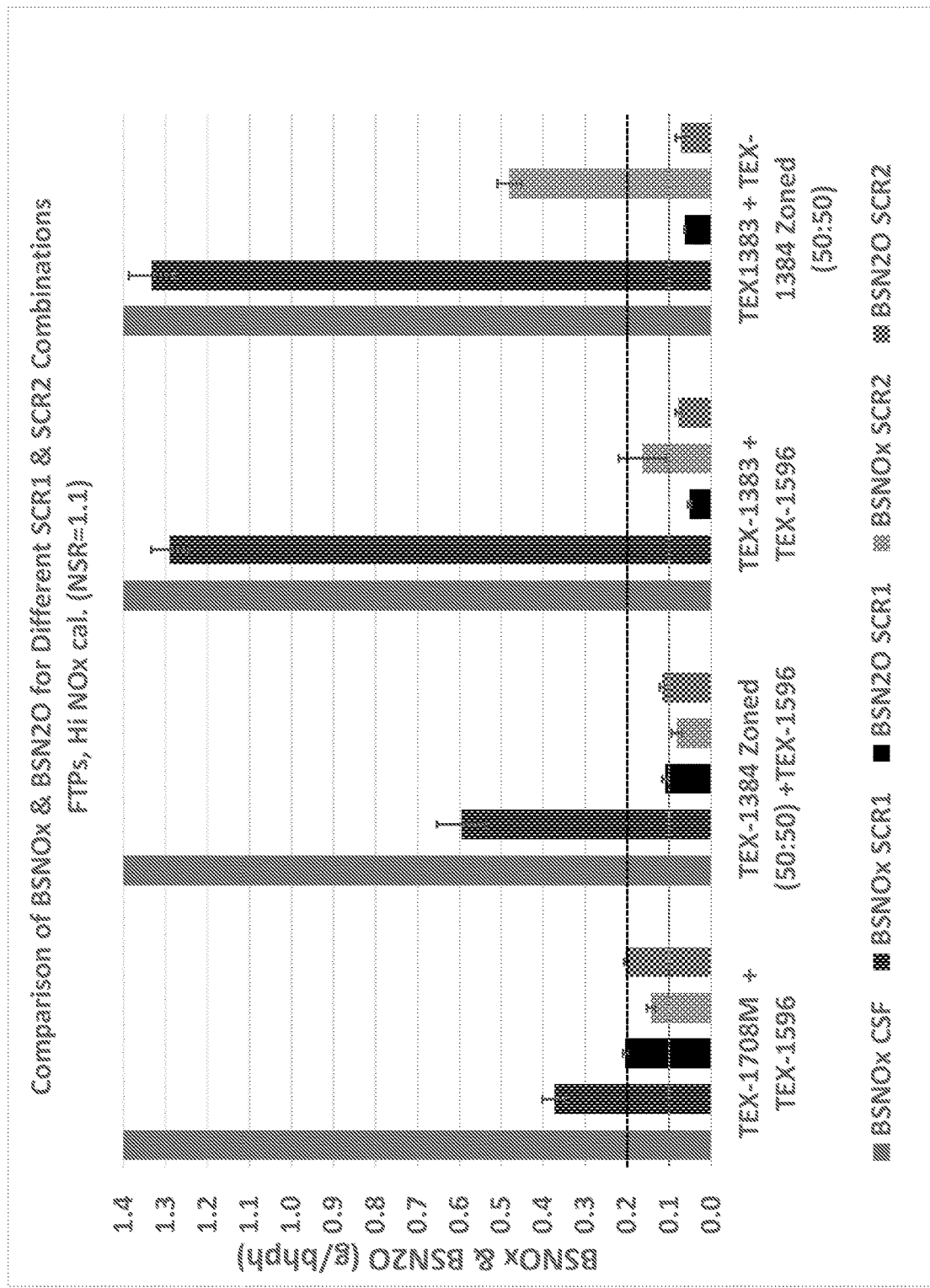
FIG. 21 is a bar graph showing an expansion of the bar graph in FIG. 20 showing BSNO$_x$ and BSN$_2$O levels (g/bhph) at CSF-out, SCR1-out and SCR2-out of four different SCR1 and SCR2 combinations with different Fe-SSZ13/Cu-SSZ13 lengths.
Figure 22:
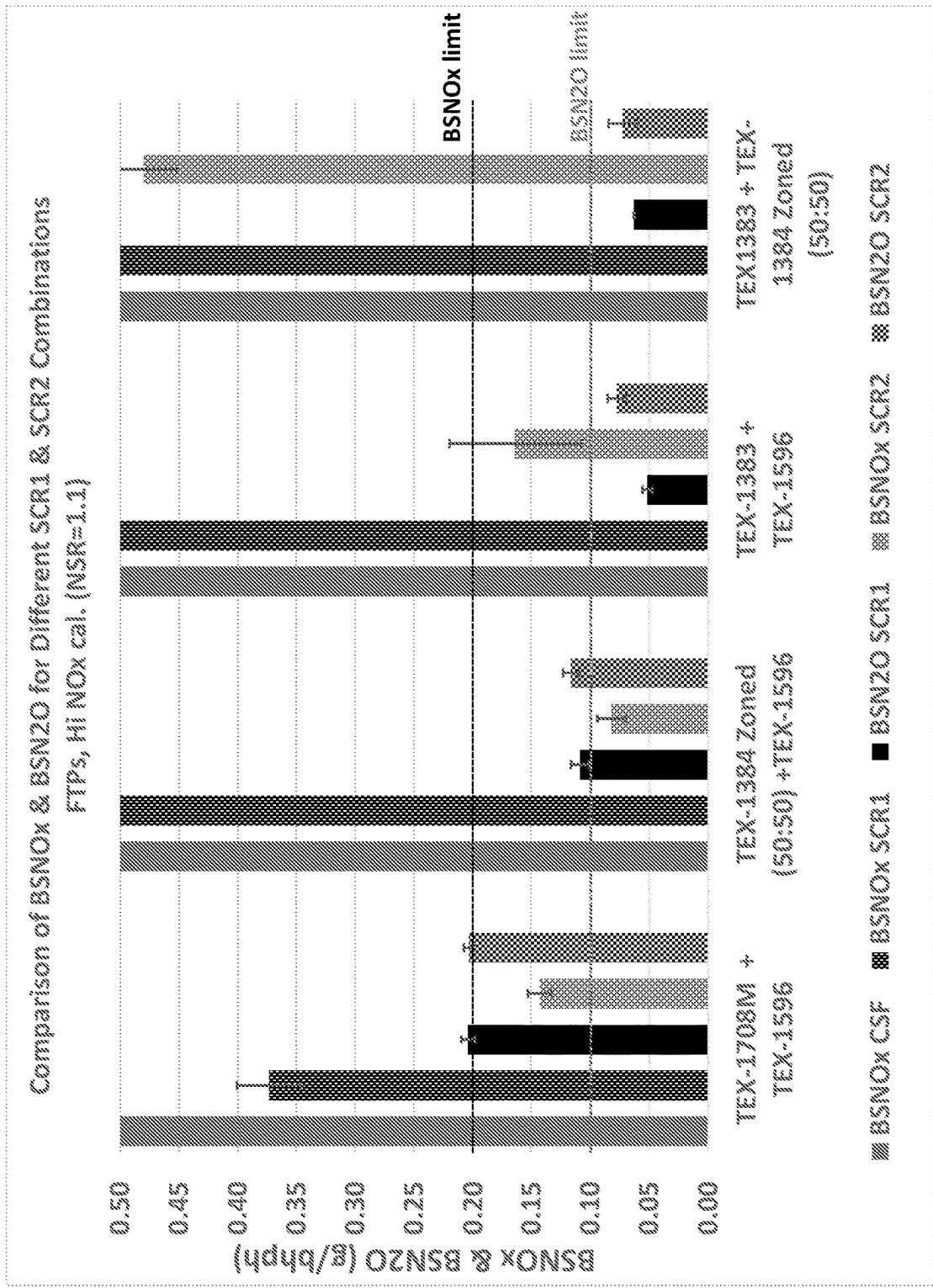
FIG. 22 is a bar graph showing an expansion of the bar graph in FIG. 20 showing BSNO$_x$ and BSN$_2$O levels (g/bhph) at CSF-out, SCR1-out and SCR2-out of four different SCR1 and SCR2 combinations with different Fe-SSZ13/Cu-SSZ13 lengths.

Testing was run on the engine in its Hi NO$_x$ calibration (>5.5 g/bhph NO$_x$). For each system configuration testing consisted of running active regeneration at 600deg C./20 min. to clean the system, followed by 8 FTPs (no soaks) with NSR=1.1 urea injection by simple NO$_x$ following. Exhaust temperatures by system location are shown in FIG. 18. For these tests the SCR1-in exhaust temperature range was 198-262° C. The NO$_x$ conversion and BSNO$_x$ levels for the first system configuration (TEX-1708+TEX-1596) are shown in FIG. 19, below. Here it can be seen that the baseline BSNO$_x$ level (CSF-out) ran in the 5.59-5.68 g/bhph range for the Hi NO$_x$ calibration. The typical NO$_x$ conversion and BSNO$_x$ pattern can be seen. At the start (FTP #1) after the prior active regeneration of the system the NO$_x$ conversion was relatively low ~74% with BSNO$_x$ in the 1.4 g/bhph range. This being due to having no stored NH$_3$ in the zeolite SCR catalysts. However, for FTPs #2 thru #8 the system quickly came to equilibrium giving NO$_x$ conversion levels of 93-94% at SCR1-out and >97% at SCR2-out. This resulted in equilibrium BSNO$_x$ levels of 0.36-0.39 g/bhph at SCR1 and 0.14-0.15 g/bhph at SCR2-out which was well below the 0.2 g/bhph target. For the testing the averages for equilibrium FTP cycles #6-8 were taken which also gave statistics for 95% confidence limits Based on this analysis for the testing of the four different catalyst systems, the BSNO$_x$ and BSN$_2$O levels are summarized in FIG. 20. In FIG. 20 it can be seen that the average baseline (CSF-out) cycle cumulative NO$_x$ (dark blue) for the tests of the 4 catalyst system configurations ran in the 5.6-5.9 g/bhph range. Significant NO$_x$ reduction was found with NSR=1.1 for all 4 systems. Expansion of the Y-axis of FIG. 20 is shown in FIG. 21 which gives a better view of the BSNO$_x$ & BSN$_2$O levels at SCR1-out and SCR2-out. Here it can be seen that the BSNO$_x$ levels at SCR1-out was lowest, 0.373 g/bhph, for the TEX-1708 Cu-SSZ13. The BSNO$_x$ level at SCR1-out was slightly higher, 0.595 g/bhph, for the TEX-1384 zoned Fe/Cu-SSZ13 (50:50). The TEX-1383 Fe-SSZ13 SCR1 gave the highest BSNO$_x$ level at 1.29-1.33 g/bhph for the final two system tests. A further expansion of the Y-axis is shown in FIG. 22, which shows the SCR2-out BSNOx and the BSN$_2$O levels more clearly. This Figure also shows the BSNO$_x$ target limit (0.2 g/bhph) and the current target BSN$_2$O limit (0.1 g/bhph).

BSNOx Results:

In FIG. 22, it can be seen that for the total Cu-SSZ13 system (TEX-1708+TEX-1596) the BSNO$_x$ at SCR2-out was well below the NO$_x$ limit (0.143 g/bhph). This amounted to a 97.45% NO$_x$ reduction relative to baseline (CSF-out).

For the system with TEX-1384 Fe/Cu-SSZ13 zoned+ TEX-1596 the BSNO$_x$ level at SCR2-out was even lower (0.082 g/bhph) or 98.59% NO$_x$ reduction. This was significantly better than for the total Cu-SSZ13 system, above, and can be attributed at least in part to the fact that the NH$_3$ slip from the up-front TEX-1384 zoned Fe/Cu-SSZ13 was slightly higher (NSR=1.08) than for the TEX-1708M Cu-SSZ13 (NSR=0.71), thereby allowing the down-stream TEX-1596 Cu-SSZ13 volume to contribute more to the overall NO$_x$ conversion.

For the system with TEX-1383 Fe-SSZ13+TEX-1596 Cu-SSZ13 the SCR2-out BSNO$_x$ was slightly higher (0.164 g/bhph), 97.12% NO$_x$ reduction. Still below the 0.2 g/bhph target on average, but with 95% confidence limits extending slightly above. This system has shown tighter confidence limits with BSNO$_x$ well below the target in prior testing.

For the system with TEX-1383 Fe-SSZ13+TEX-1384 zoned Fe/Cu-SSZ13 the SCR2-out BSNO$_x$ was higher still (0.48 g/bhph) and more than double the target (0.2 g/bhph).

For these tests the system with TEX-1384 zoned Fe/Cu-SSZ13+TEX-1596 Cu-SSZ13 gave the lowest BSNO$_x$ at SCR2-out.

BSN$_2$O Results:

In FIG. 22, it can be seen that for the system with TEX-1708M Cu-SSZ13+TEX-1596 Cu-SSZ13. The BSN$_2$O levels at SCR1-out and SCR2-out locations were both above 0.2 g/bhph, at least double the target limit of 0.1 g/bhph.

For the system with TEX-1384 zoned Fe/Cu-SSZ13+TEX-1596 Cu-SSZ13 the BSN$_2$O levels at both SCR1-out and SCR2-out were significantly reduced, but still slightly above the 0.1 g/bhph target.

For the system with TEX-1383 Fe-SSZ13+TEX-1596 Cu-SSZ13 the BSN$_2$O levels a SCR1-out and SCR2-out were reduced further to 0.052 g/bhph and 0.078 g/bhph, respectively, so both locations were below the 0.1 g/bhph limit with margin.

For the system with TEX-1383 Fe-SSZ13+TEX-1384 zoned Fe/Cu-SSZ13 the BSN$_2$O levels were comparable to the system with TEX-1383 Fe-SSZ13+TEX-1596 Cu-SSZ13 so no additional BSN$_2$O reduction was found for this system. Here it can be seen that at SCR2-out the lowest BSNO$_x$ (0.082 g/bhph) was achieved for the system with TEX-1384 zoned Fe/Cu-SSZ13+TEX-1596 Cu-SSZ13. For the lowest BSN$_2$O and still good BSNO$_x$ levels the system with TEX-1383 Fe-SSZ13+TEX-1596 Cu-SSZ13 was the best. It would appear that the optimum for low BSNO$_x$ and low BSN$_2$O might lie somewhere between these systems and a TEX-1384 zoned Fe/Cu-SSZ13 with perhaps 67:33 or 75:25 zoning giving a better balance in overall performance.

What is claimed is:

1. An exhaust gas treatment system for treatment of an exhaust gas stream containing NO$_x$, comprising:
an engine producing the exhaust gas stream; and
a catalyst system including a selective catalytic reduction article comprising an upstream zone comprising an iron-promoted first molecular sieve material, and a downstream zone comprising a copper-promoted second molecular sieve material, wherein the first and second molecular sieve materials are both small pore molecular sieve materials having a CHA framework type.

2. The exhaust gas treatment system of claim 1, wherein the selective catalytic reduction article further comprises a substrate having an axial length and an upstream end and a downstream end, wherein the upstream zone comprising the iron-promoted first molecular sieve material is coated onto the upstream end of the substrate and the downstream zone comprising the copper-promoted second molecular sieve material is coated onto the downstream end of the substrate.

3. The exhaust gas treatment system of claim 2, wherein the substrate comprises a flow through monolith.

4. The exhaust gas treatment system of claim 2, wherein the substrate is a wall flow filter.

5. The exhaust gas treatment system of claim 2, wherein the upstream zone and the downstream zone at least partially overlap.

6. The exhaust gas treatment system of claim 5, wherein the upstream zone is coated such that the upstream zone at least partially overlaps with the downstream zone.

7. The exhaust gas treatment system of claim 5, wherein the downstream zone is coated such that the downstream zone at least partially overlaps with the upstream zone.

8. The exhaust gas treatment system of claim 2, wherein the upstream zone abuts the downstream zone.

9. The exhaust gas treatment system of claim 2, wherein there is a gap between the upstream zone and downstream zone.

10. The exhaust gas treatment system of claim 1, wherein the iron-promoted first molecular sieve material comprises from about 0.01% to about 10.0% by weight iron, calculated as iron oxide.

11. The exhaust gas treatment system of claim 1, wherein the copper-promoted second molecular sieve material comprises from about 2% to about 5% by weight copper, calculated as copper oxide.

12. The exhaust gas treatment system of claim 1, wherein: (i.) the upstream zone is on a first substrate, wherein the first substrate comprises a first and second zone, wherein the first zone comprises the iron-promoted first molecular sieve material and the second zone comprises a copper-promoted third molecular sieve material, wherein the first zone is exposed to the exhaust gas stream prior to the second zone; and wherein the downstream zone is on a second substrate; or (ii) the upstream zone is on a second substrate and the downstream zone is on a first substrate, wherein the first substrate comprises a first and second zone, wherein the first zone comprises an iron-promoted fourth molecular sieve material and the second zone comprises the copper-promoted second molecular sieve material, wherein the first zone is exposed to the exhaust gas stream prior to the second zone.

13. The exhaust gas treatment system of claim 12, wherein the first zone abuts the second zone on the first substrate.

14. The exhaust gas treatment system of claim 12, wherein the first zone extends at least 50% of the total axial length of the first substrate.

15. The exhaust gas treatment system of claim 12, wherein the first zone extends less than 50% of the total axial length of the first substrate.

16. The exhaust gas treatment system of claim 12, wherein the first zone extends less than 35% of the total axial length of the first substrate.

17. The exhaust gas treatment system of claim 1, wherein the upstream zone and the downstream zone are coated onto the same substrate.

18. The exhaust gas treatment system of claim 1, wherein the upstream zone is coated onto a first substrate and the downstream zone is coated onto a second substrate.

19. The exhaust gas treatment system of claim 18, wherein the first substrate comprises a wall flow filter and the second substrate comprises a flow through monolith.

20. The exhaust gas system of claim 2, wherein the selective catalytic reduction article in the catalyst system further comprises a top washcoat layer and a bottom washcoat layer, wherein the bottom washcoat layer comprises a copper-promoted fifth molecular sieve material coated directly onto the substrate, and the top washcoat layer comprises the upstream zone and the downstream zone coated directly onto the top of the bottom washcoat layer.

21. The exhaust gas treatment system of claim 1, wherein the catalyst system further comprises an ammonia oxidation catalyst located downstream of the selective catalytic reduction article.

22. The exhaust gas system of claim 21, wherein the ammonia oxidation catalyst comprises a platinum group metal and a molecular sieve promoted with copper, iron, or combinations thereof.

23. The exhaust gas treatment system of claim 1, further comprising a catalyzed soot filter located upstream of the catalyst system.

24. A method for treatment of an exhaust gas stream, the method comprising treating the exhaust gas stream containing NO$_x$ with an exhaust gas treatment system including a selective catalytic reduction article comprising two zones including (1) an upstream SCR zone that does not contain a copper-promoted zeolite, the upstream SCR zone comprising a small pore, iron-promoted molecular sieve material having a double six ring unit, wherein the upstream SCR zone is operative to minimize formation of $N_2O$; and (2) a downstream active SCR zone comprising a small pore copper-promoted molecular sieve having a double six ring unit; wherein the catalyst system is effective to reduce $NO_x$ levels; and wherein the small pore, molecular sieve materials having the double six ring unit have a CHA framework type.

25. The method of claim 24, further comprising flowing the exhaust gas stream through an upstream catalyzed soot filter to produce an outflow $NO_2/NO_x$ ratio of about 0.1 to about 0.85 prior to reaching the upstream SCR zone.

26. The method of claim 24, further comprising adding a reductant in excess to the engine exhaust gas stream prior to such gas stream contacting the selective catalytic reduction article, wherein the molar ratio of reductant to $NO_x$ is at least about 1.05.

27. The method of claim 26, wherein the reductant is urea.

28. The method of claim 24, wherein the formation of $N_2O$ is at least 65% lower compared to an exhaust gas treatment system wherein the upstream SCR zone does not comprise iron-promoted molecular sieve material.

29. A method of treating an exhaust gas stream, comprising passing an exhaust gas stream through the exhaust gas treatment system of claim 1 such that $NO_x$ conversion is at least 75%.

\* \* \* \* \*